United States Patent
Barrett et al.

(10) Patent No.: US 9,912,588 B2
(45) Date of Patent: Mar. 6, 2018

(54) BINDING IEEE 802.11 MAC FRAMES TO LOGICAL CHANNELS

(71) Applicant: BlackBerry Limited, Waterloo (CA)

(72) Inventors: Stephen John Barrett, Haywards Heath (GB); Nicholas William Anderson, Exeter (GB); Eswar Vutukuri, Havant (GB); James Randolph Winter Lepp, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 2 days.

(21) Appl. No.: 14/465,668

(22) Filed: Aug. 21, 2014

(65) Prior Publication Data
US 2016/0057055 A1    Feb. 25, 2016

(51) Int. Cl.
| | |
|---|---|
| *H04L 12/741* | (2013.01) |
| *H04L 29/12* | (2006.01) |
| *H04W 72/04* | (2009.01) |
| *H04W 76/02* | (2009.01) |
| *H04W 84/12* | (2009.01) |
| *H04W 92/02* | (2009.01) |
| *H04W 80/02* | (2009.01) |

(52) U.S. Cl.
CPC .......... *H04L 45/74* (2013.01); *H04L 61/6022* (2013.01); *H04W 72/0406* (2013.01); *H04W 76/022* (2013.01); *H04W 76/025* (2013.01); *H04W 80/02* (2013.01); *H04W 84/12* (2013.01); *H04W 92/02* (2013.01)

(58) Field of Classification Search
CPC ....... H04L 1/0007; H04L 29/06; H04L 45/74; H04L 45/741; H04L 61/6022; H04W 28/065; H04W 72/0406; H04W 84/12; H04W 76/022; H04W 76/025; H04W 80/02; H04W 92/02
See application file for complete search history.

(56) References Cited

U.S. PATENT DOCUMENTS

| | | | |
|---|---|---|---|
| 6,438,128 B1 * | 8/2002 | Kashyap ................ | H04L 29/06 370/389 |
| 2005/0135291 A1 * | 6/2005 | Ketchum ................ | H04L 29/06 370/319 |
| 2007/0263568 A1 * | 11/2007 | Kim .................... | H04W 28/065 370/331 |

(Continued)

OTHER PUBLICATIONS

Asadi, "WiFi Direct and LTE D2D in Action", Wireless Days, Nov. 13-15, 2013.*

(Continued)

*Primary Examiner* — Khoa Huynh
(74) *Attorney, Agent, or Firm* — Fish & Richardson P.C.

(57) ABSTRACT

An IEEE 802.11 media access control (MAC) frame (or contents thereof) at a transmitter apparatus includes information from which a logical channel carrying traffic can be identified, so that a receiver apparatus, when unpacking the IEEE 802.11 MAC frame (or contents thereof), is able to route the traffic to the appropriate radio link control (RLC) entity associated with the logical channel. An evolved Node B (eNB) that is also an access point (AP) distinguishes conventional uplink wireless local area network (WLAN) traffic from traffic that is to be routed to an RLC layer.

8 Claims, 19 Drawing Sheets

(56) References Cited

U.S. PATENT DOCUMENTS

| | | | |
|---|---|---|---|
| 2008/0101312 A1* | 5/2008 | Suzuki | H04L 1/0007 |
| | | | 370/342 |
| 2013/0088983 A1* | 4/2013 | Pragada | H04W 16/14 |
| | | | 370/252 |
| 2014/0119353 A1 | 5/2014 | McCann et al. | |

OTHER PUBLICATIONS

Extended European Search Report issued in EP Application No. 15170535.7 dated Jan. 14, 2016; 10 pages.
Chin-Sean Sum et al.; IEEE P802.11 Wireless LANs; "Proposed Text on Secured Connectivity in Channel Availability Query Procedures" Jul. 15, 2011; 5 pages.
Office Action issued in Canadian Application No. 2,893,851 dated Jun. 13, 2016; 5 pages.
Office Action issued in Canadian Application No. 2,893,851 dated Apr. 20, 2017; 8 pages.
Communication Pursuant to Article 94(3) EPC issued in EP Application No. 15170535.7 dated Feb. 17, 2017; 5 pages.

* cited by examiner

BINDING IEEE 802.11 MAC FRAMES TO LOGICAL CHANNELS

TECHNICAL FIELD

This document relates to the technical field of $3^{rd}$ generation partnership protocol (3GPP) communication and wireless local area network (WLAN) communication.

BACKGROUND

Long Term Evolution (LTE) is a standard for wireless communication of high-speed data, being developed by the 3GPP. LTE is characterized by increased capacity and speed of wireless data networks. The network architecture is an Internet Protocol (IP)-based system with significantly reduced transfer latency compared to earlier technology.

Wireless local area network (WLAN) technology based on the IEEE 802.11™ family of standards is widely implemented. There is a drive to integrate aspects of WLAN technology with LTE, so that the existing WLAN technology can be subject to a large scale re-use, while benefiting from the core networks to which LTE devices connect.

SUMMARY

This document proposes that an IEEE 802.11 media access control (MAC) frame (or contents thereof) at a transmitter apparatus includes information from which the logical channel carrying traffic can be identified, so that a receiver apparatus, when unpacking the IEEE 802.11 MAC frame (or contents thereof), is able to route the traffic to the appropriate radio link control (RLC) entity associated with the logical channel. In some of the techniques, the information from which the logical channel can be identified is in the header of the IEEE 802.11 MAC frame. In others of the techniques, the information from which the logical channel can be identified is in the payload of the IEEE 802.11 MAC frame. Techniques are proposed in this document that enable an evolved Node B (eNB) that is also an access point (AP) to distinguish conventional uplink wireless local area network (WLAN) traffic from traffic that is to be routed to an RLC layer. Throughout this document, what is actually received from or routed to an RLC entity is an RLC protocol data unit (PDU).

DETAILED DESCRIPTION

Figure 1A:
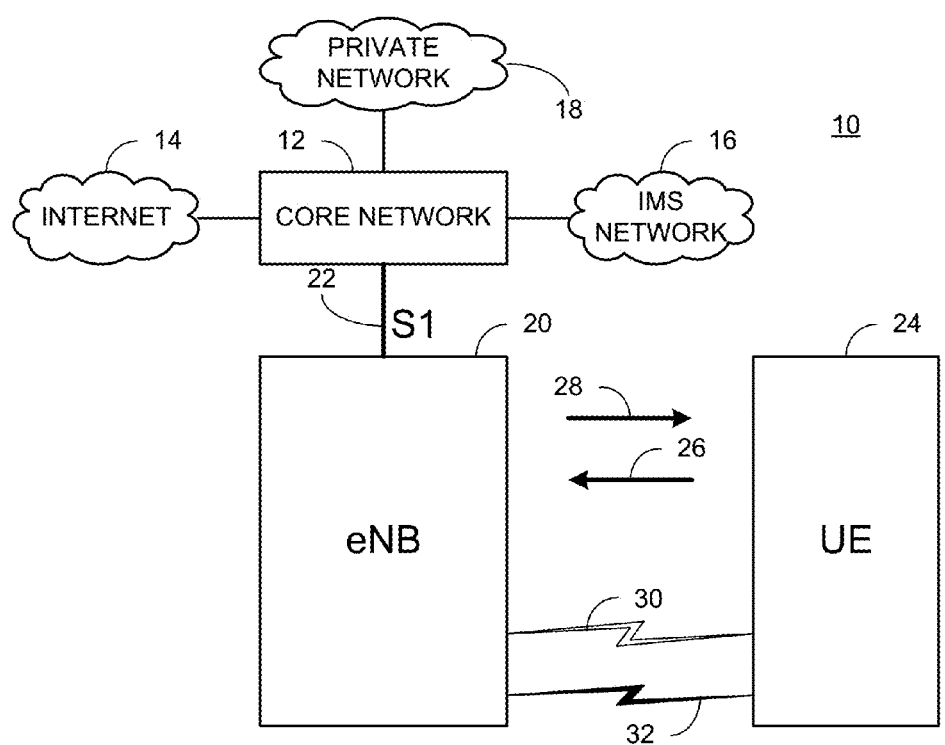
FIGS. 1A-1H illustrate example communication networks.

FIG. 1A illustrates an example communication network 10. A core network 12, for example, an evolved packet core (EPC), provides access to one or more services or packet data networks. For example, the core network 12 provides access to the Internet 14, to an Internet Protocol (IP) multimedia subsystem (IMS) network 16, and to a private network 18. An evolved Node B (eNB) apparatus 20 is coupled to the core network 12, for example, via an S1 connection 22. A user equipment (UE) apparatus 24, which may also be referred to as a mobile station (MS), communicates with the eNB 20 in order to access services via the core network 12. Uplink (UL) communications are indicated by an arrow 26 and downlink (DL) communications are indicated by an arrow 28.

The UE 24 and the eNB 20 employ carrier aggregation. In other words, the UE 24 can transmit and/or receive traffic of a given flow over two carriers simultaneously, and each carrier is transmitted from and/or received by the eNB 20. In the example illustrated in FIG. 1A, communications between the UE 24 and the eNB 20 are carried out over an evolved universal terrestrial radio access (e-UTRA) air interface 30 using one or two first carriers and over a WLAN air interface 32 using one or two second carriers. In order to employ this form of carrier aggregation, the eNB 20 implements a protocol stack (not shown) that includes Long Term Evolution (LTE) media access control (MAC)/physical (PHY) layers and IEEE 802.11 MAC/PHY layers, both interfacing to a common radio link control (RLC) layer that itself interfaces to a common packet data convergence protocol (PDCP) layer. Examples of the protocol stack implemented by the eNB 20 are illustrated in FIG. 2A, FIG. 3A, FIG. 4A and FIG. 7A, and are discussed in detail below. In order to employ this form of carrier aggregation, the UE 24 implements a protocol stack (not shown) that includes LTE MAC/PHY layers and IEEE 802.11 MAC/PHY layers, both interfacing to a common RLC layer that itself interfaces to a common PDCP layer. Examples of the protocol stack implemented by the UE 24 are illustrated in FIG. 2A, FIG. 3A, FIG. 4A and FIG. 7A, and are discussed in detail below.

Traffic between the UE 24 and the eNB 20 is carried on radio bearers that are set up between the transmitter apparatus and the receiver apparatus. Each radio bearer corresponds to a single entity of the PDCP layer. For downlink communications, the eNB 20 is the transmitter apparatus and the UE 24 is the receiver apparatus. For uplink communications, the UE 24 is the transmitter apparatus and the eNB 20 is the receiver apparatus.

Figure 1B:
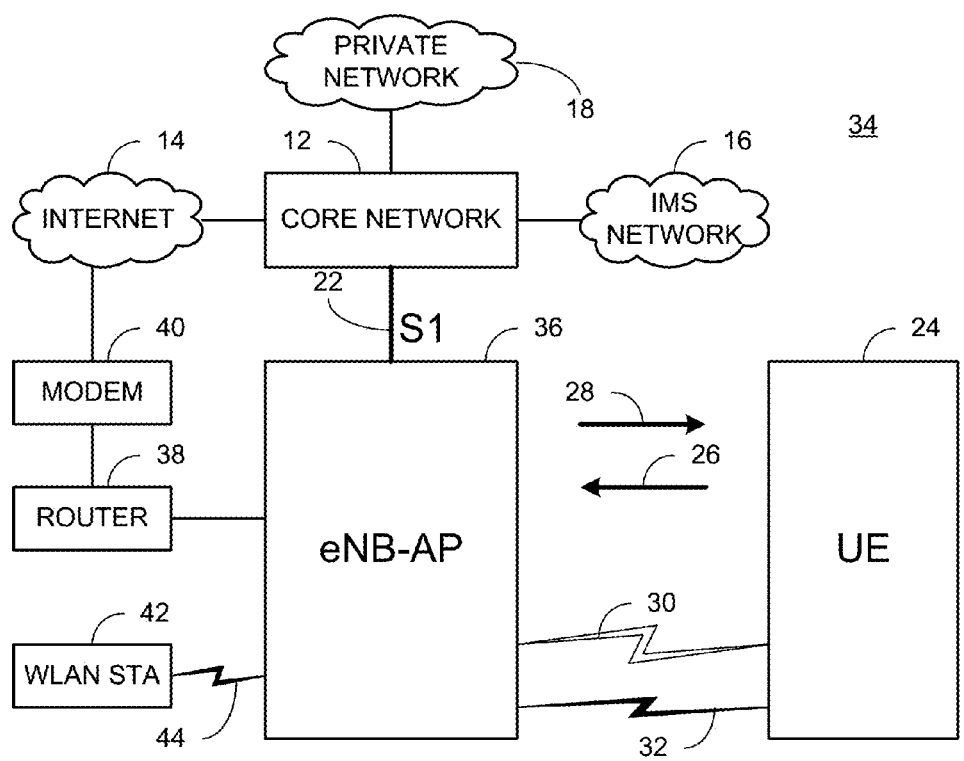

FIG. 1B illustrates another communication network 34. The communication network 110 differs from the communication network 10 illustrated in FIG. 1A in that the eNB 20 is replaced by an eNB-access point (AP) apparatus 36 that supports a WLAN. Independent of the core network 12, the eNB-AP 36 is coupled to the Internet 14, for example, via a router 38 and a modem 40. The eNB-AP 36 is capable of conventional WLAN communications with a WLAN station 42 over a WLAN air interface 44. The WLAN station 42 may implement a typical WLAN protocol stack that includes the IEEE 802.11 MAC/PHY layers under an IEEE 802.2 Logical Link Control (LLC) layer. Examples of the protocol stack implemented by the eNB-AP 36 are illustrated in FIG. 2F, FIG. 3F, FIG. 4F and FIG. 7F, and are discussed in detail below. Currently there is no mechanism within the IEEE 802.11 MAC/PHY framework or within the IEEE 802.2™ LLC framework to distinguish conventional uplink WLAN traffic from traffic that is to be routed to an RLC layer. Techniques are proposed in this document that enable an eNB-AP to distinguish conventional uplink WLAN traffic from traffic that is to be routed to an RLC layer. For example, using these techniques, the eNB-AP 36 distinguishes between uplink traffic over the WLAN air interface 44 that is to be routed to the router 38 from uplink traffic over the WLAN air interface 32 that is to be routed to the RLC layer.

Figure 1C:
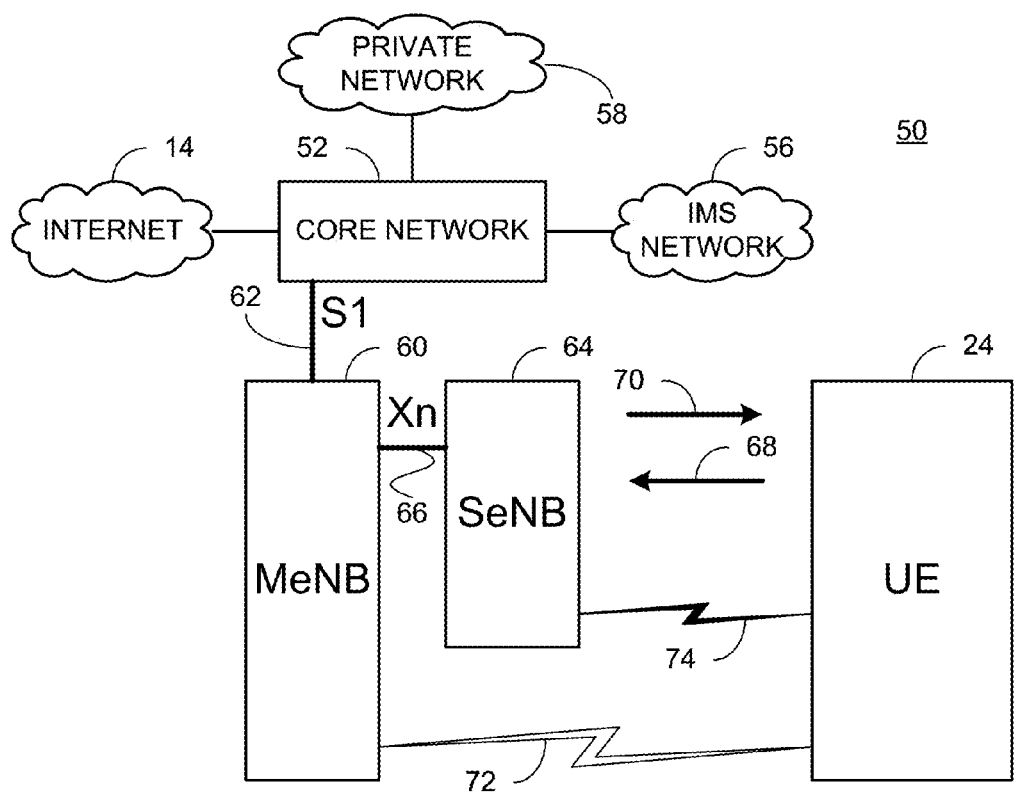

FIG. 1C illustrates another example communication network 50. A core network 52, for example, an EPC, provides access to one or more services or packet data networks. For example, the core network 52 provides access to the Internet 14, to an IMS network 56, and to a private network 58. A master evolved Node B (MeNB) apparatus 60 is coupled to the core network 52, for example, via an S1 connection 62. A secondary evolved Node B (SeNB) apparatus 64 is coupled to the MeNB 60, for example, via an Xn interface 66. The UE 24 communicates with the MeNB 60 and with the SeNB 64 in order to access services via the core network 52. UL communications are indicated by an arrow 68 and DL communications are indicated by an arrow 70.

The MeNB 60 and the SeNB 64 together provide dual connectivity (according to a variant known as "Variant 3C"). In other words, the UE 24 can receive service simultaneously over a cell of the MeNB 60 and over a cell of the SeNB 64. In the example illustrated in FIG. 1C, communications between the UE 24 and the MeNB 60 are carried out over an e-UTRA air interface 72, and communications between the UE 24 and the SeNB 64 are carried out over a WLAN air interface 74. The MeNB 60 may implement a conventional e-UTRA protocol stack (not shown) that includes LTE MAC/PHY layers. The SeNB 64 implements a protocol stack (not shown) that includes IEEE 802.11 MAC/PHY layers under an RLC layer. The RLC layer of the SeNB 64 interfaces to a PDCP layer (not shown) in the protocol stack implemented by the MeNB 60. Examples of the protocol stack implemented by the SeNB 64 are illustrated in FIG. 2E, FIG. 3E, FIG. 4E and FIG. 7E, and are discussed in detail below.

Traffic between the UE 24 and the MeNB 60 is carried on radio bearers. Traffic between the UE 24 and the SeNB 64 is carried on radio links that are set up between the transmitter apparatus and the receiver apparatus. Traffic between the UE 24 and the MeNB 60 is carried on radio links that are set up between the transmitter apparatus and the receiver apparatus. For downlink communications, the MeNB 60 or the SeNB 64 is the transmitter apparatus and the UE 24 is the receiver apparatus. For uplink communications, the UE 24 is the transmitter apparatus, and the MeNB 60 or the SeNB 64 is the receiver apparatus.

Figure 1D:
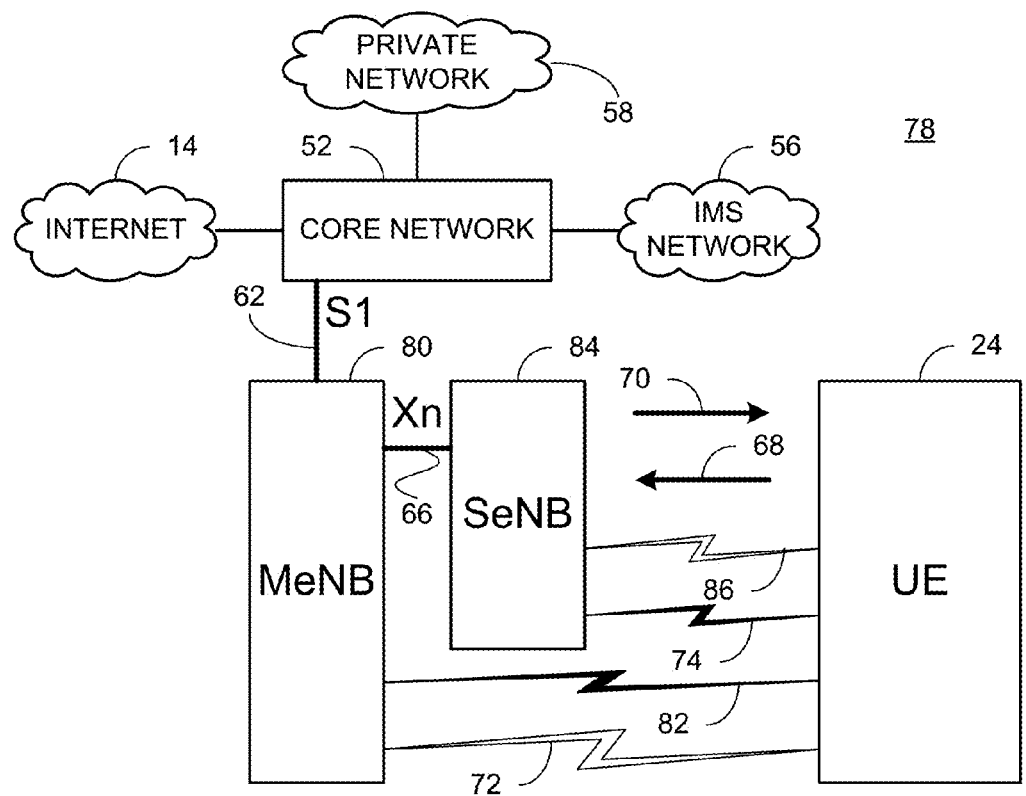

FIG. 1D illustrates another example communication network 78. The communication network 78 differs from the communication network 50 illustrated in FIG. 1C in that the MeNB 60 is replaced by a MeNB apparatus 80 that employs carrier aggregation (and therefore communications between the UE 24 and the MeNB 80 are carried out over the e-UTRA air interface 72 and over a WLAN air interface 82). Alternatively, the communication network 78 differs from the communication network 50 in that the SeNB 64 is replaced by a SeNB apparatus 84 that employs carrier aggregation (and therefore communications between the UE 24 and the SeNB 84 are carried out over an e-UTRA air interface 86 and over the WLAN air interface 74). Alternatively, the communication network 78 differs from the communication network 50 in that the MeNB 60 is replaced by the MeNB 80 and the SeNB 64 is replaced by the SeNB 84. In order to employ this form of carrier aggregation the MeNB 80 implements a protocol stack (not shown) that includes LTE MAC/PHY layers and IEEE 802.11 MAC/PHY layers, both interfacing to a common RLC layer that itself interfaces to a common PDCP layer. Examples of the protocol stack implemented by the MeNB 80 are illustrated in FIG. 2A, FIG. 3A, FIG. 4A and FIG. 7A, and are discussed in detail below. In order to employ this form of carrier aggregation the SeNB 84 implements a protocol stack (not shown) that includes LTE MAC/PHY layers and IEEE 802.11 MAC/PHY layers, both interfacing to a common RLC layer that itself interfaces to a PDCP layer in the protocol stack implemented by the MeNB 60 or the MeNB 80. Examples of the protocol stack implemented by the SeNB 84 are illustrated in FIG. 2C, FIG. 3C, FIG. 4C and FIG. 7C, and are discussed in detail below.

Traffic between the UE 24 and the MeNB 60 (or the MeNB 80) is carried on radio bearers. Traffic between the UE 24 and the SeNB 64 (or the SeNB 84) is carried on radio links that are set up between the transmitter apparatus and the receiver apparatus. Traffic between the UE 24 and the MeNB 60 (or the MeNB 80) is carried on radio links that are set up between the transmitter apparatus and the receiver apparatus. For downlink communications, the MeNB 60 or the MeNB 80 or the SeNB 64 or the SeNB 84 is the transmitter apparatus and the UE 24 is the receiver apparatus. For uplink communications, the UE 24 is the transmitter apparatus, and the MeNB 60 or the MeNB 80 or the SeNB 64 or the SeNB 84 is the receiver apparatus.

Figure 1E:
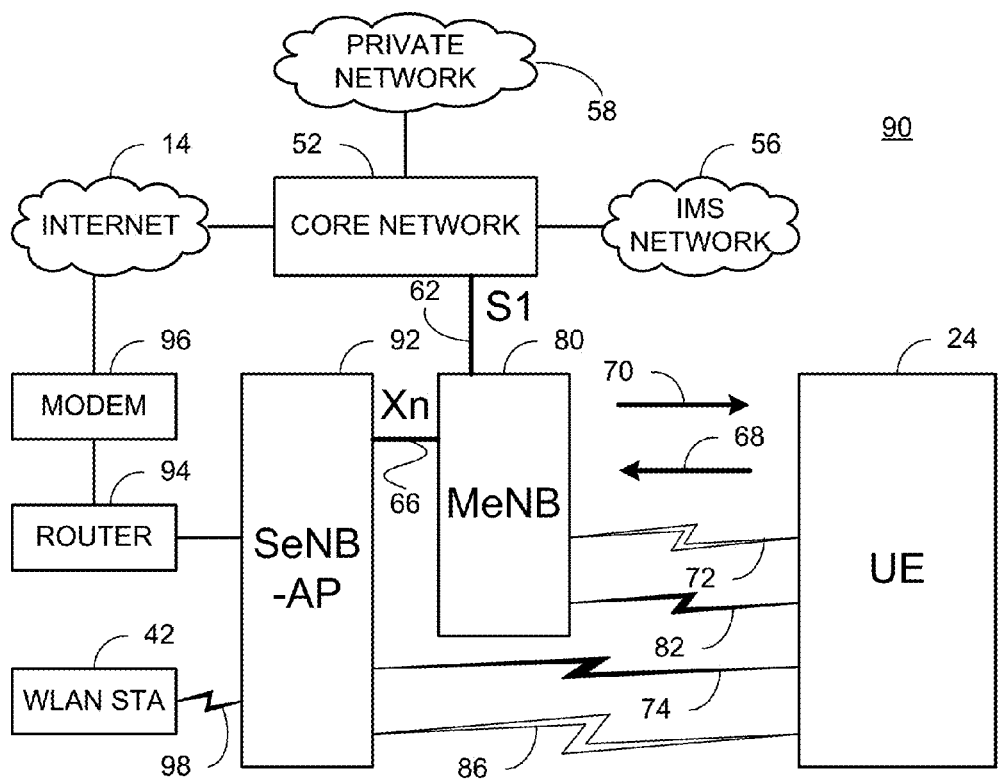

FIG. 1E illustrates another communication network 90. The communication network 90 differs from the communication network 78 illustrated in FIG. 1D in that the SeNB 84 is replaced by a SeNB-AP apparatus 92 that supports a WLAN. (Although the MeNB 80 is illustrated in FIG. 1E, in an alternative communication network, the MeNB 80 is replaced by the MeNB 60.) Independent of the core network 52, the SeNB-AP 92 is coupled to the Internet 14, for example, via a router 94 and a modem 96. The SeNB-AP 92 is capable of conventional WLAN communications with the WLAN station 42 over a WLAN air interface 98. Examples of the protocol stack implemented by the SeNB-AP 92 are illustrated in FIG. 2H, FIG. 3H, FIG. 4H and FIG. 7H, and are discussed in detail below. Techniques are proposed in this document that enable a SeNB-AP to distinguish conventional uplink WLAN traffic from traffic that is to be routed to an RLC layer. For example, using these techniques, the SeNB-AP 92 distinguishes between uplink traffic over the WLAN air interface 98 that is to be routed to the router 94 from uplink traffic over the WLAN air interface 74 that is to be routed to the RLC layer.

Figure 1F:
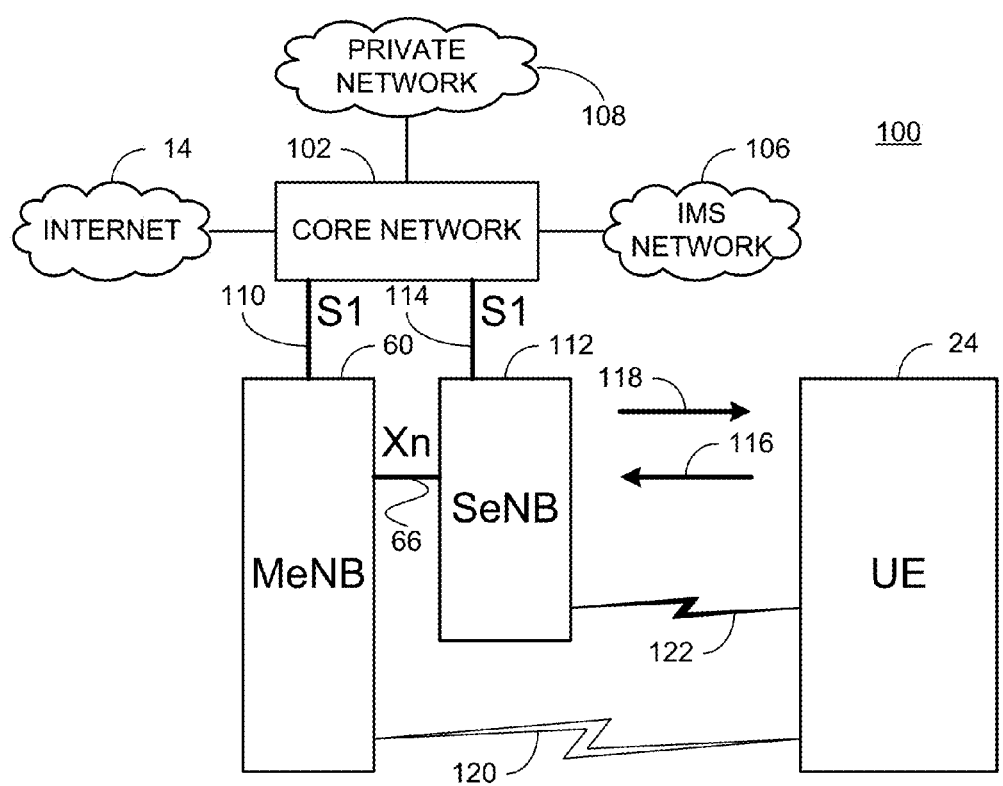

FIG. 1F illustrates another example communication network 100. A core network 102, for example, an EPC, provides access to one or more services or packet data networks. For example, the core network 102 provides access to the Internet 14, to an IMS network 106, and to a private network 108. The MeNB 60 is coupled to the core network 102, for example, via an S1 connection 110. A SeNB apparatus 112 is coupled to the core network 102, for example, via an S1 connection 114. The SeNB 112 is coupled to the MeNB 60 via the Xn connection 66. The UE 24 communicates with the MeNB 60 and with the SeNB 112 in order to access services via the core network 102. UL communications are indicated by an arrow 116 and DL communications are indicated by an arrow 118.

The MeNB 60 and the SeNB 112 together provide dual connectivity (according to a variant known as "Variant 1A"). In other words, the UE 24 can receive service simultaneously over a cell of the MeNB 60 and over a cell of the SeNB 112. In the example illustrated in FIG. 1F, communications between the UE 24 and the MeNB 60 are carried out over an e-UTRA air interface 120, and communications between the UE 24 and the SeNB 112 are carried out over a WLAN air interface 122. As with FIG. 1C, the MeNB 60 may implement a conventional e-UTRA protocol stack (not shown) that includes LTE MAC/PHY layers. The SeNB 112 implements a protocol stack (not shown) that includes IEEE 802.11 MAC/PHY layers under an RLC layer which itself is under a PDCP layer. Examples of the protocol stack implemented by the SeNB 112 are illustrated in FIG. 2D, FIG. 3D, FIG. 4D and FIG. 7D, and are discussed in detail below.

Traffic between the UE 24 and the MeNB 60 is carried on radio bearers that are set up between the transmitter apparatus and the receiver apparatus. Traffic between the UE 24 and the SeNB 112 is carried on radio bearers that are set up between the transmitter apparatus and the receiver apparatus. For downlink communications, the MeNB 60 or the SeNB 112 is the transmitter apparatus and the UE 24 is the receiver apparatus. For uplink communications, the UE 24 is the transmitter apparatus, and the MeNB 60 or the SeNB 112 is the receiver apparatus.

Figure 1G:
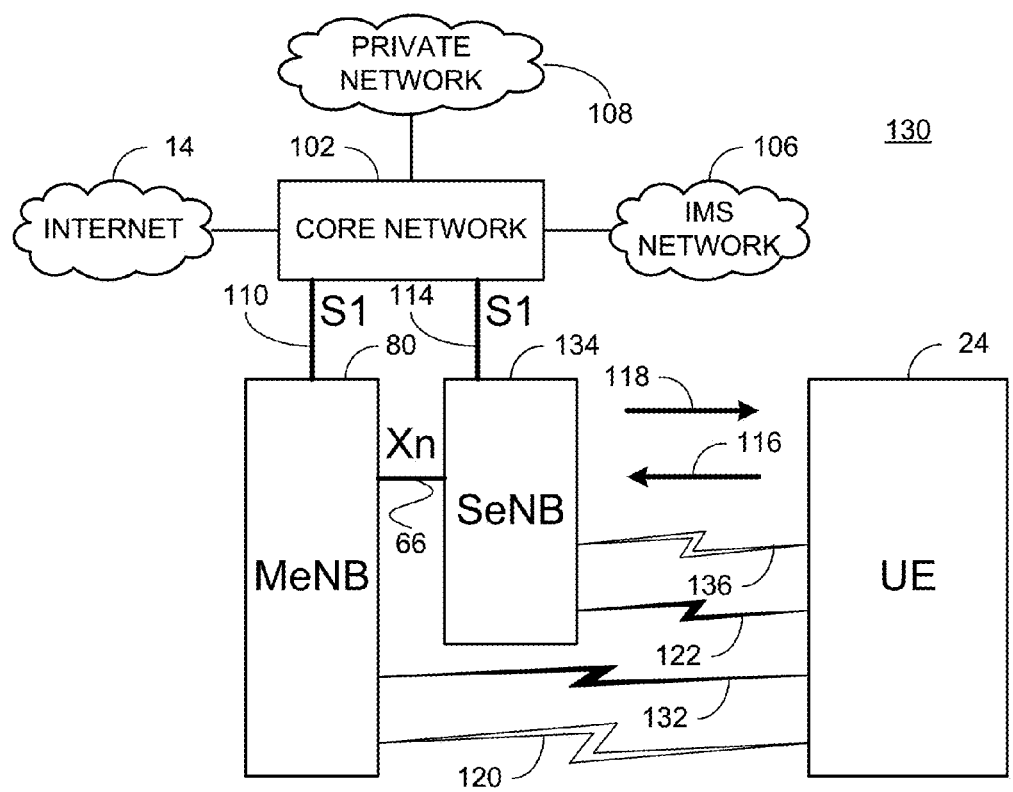

FIG. 1G illustrates another example communication network 130. The communication network 130 differs from the communication network 100 illustrated in FIG. 1F in that the MeNB 60 is replaced by the MeNB 80 that employs carrier aggregation (and therefore communications between the UE 24 and the MeNB 80 are carried out over the e-UTRA air interface 120 and over a WLAN air interface 132). Alternatively, the communication network 130 differs from the communication network 100 in that the SeNB 112 is replaced by a SeNB apparatus 134 that employs carrier aggregation (and therefore communications between the UE 24 and the SeNB 134 are carried out over an e-UTRA air interface 136 and over the WLAN air interface 122). Alternatively, the communication network 130 differs from the communication network 100 in that the MeNB 60 is replaced by the MeNB 80 and the SeNB 112 is replaced by the SeNB 134. In order to employ this form of carrier aggregation the MeNB 80 implements a protocol stack (not shown) that includes LTE MAC/PHY layers and IEEE 802.11 MAC/PHY layers, both interfacing to a common RLC layer that itself interfaces to a common PDCP layer. Examples of the protocol stack implemented by the MeNB 80 are illustrated in FIG. 2A, FIG. 3A, FIG. 4A and FIG. 7A, and are discussed in detail below. In order to employ this form of carrier aggregation the SeNB 134 implements a protocol stack (not shown) that includes LTE MAC/PHY layers and IEEE 802.11 MAC/PHY layers, both interfacing to a common RLC layer that itself interfaces to a PDCP layer. Examples of the protocol stack implemented by the SeNB 134 are illustrated in FIG. 2B, FIG. 3B, FIG. 4B and FIG. 7B, and are discussed in detail below.

Traffic between the UE 24 and the MeNB 60 (or the MeNB 80) is carried on radio bearers that are set up between the transmitter apparatus and the receiver apparatus. Traffic between the UE 24 and the SeNB 112 (or the SeNB 134) is carried on radio bearers that are set up between the transmitter apparatus and the receiver apparatus. For downlink communications, the MeNB 60 or the MeNB 80 or the SeNB 112 or the SeNB 134 is the transmitter apparatus and the UE 24 is the receiver apparatus. For uplink communications, the UE 24 is the transmitter apparatus, and the MeNB 60 or the MeNB 80 or the SeNB 112 or the SeNB 134 is the receiver apparatus.

Figure 1H:
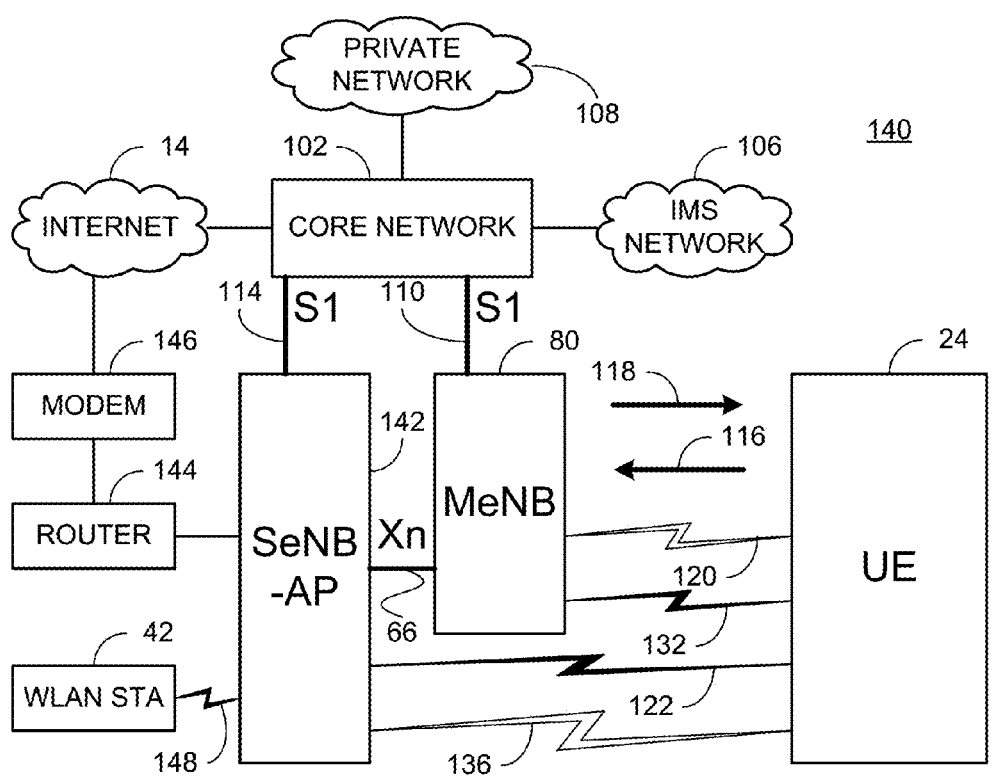

FIG. 1H illustrates another communication network 140. The communication network 140 differs from the communication network 130 illustrated in FIG. 1G in that the SeNB 130 is replaced by a SeNB-AP apparatus 142 that supports a WLAN. (Although the MeNB 80 is illustrated in FIG. 1H, in an alternative communication network, the MeNB 80 is replaced by the MeNB 60.) Independent of the core network 102, the SeNB-AP 142 is coupled to the Internet 14, for example, via a router 144 and a modem 146. The SeNB-AP 142 is capable of conventional WLAN communications with the WLAN station 42 over a WLAN air interface 148. Examples of the protocol stack implemented by the SeNB-AP 142 are illustrated in FIG. 2G, FIG. 3G, FIG. 4G and FIG. 7G, and are discussed in detail below. Techniques are proposed in this document that enable a SeNB-AP to distinguish conventional uplink WLAN traffic from traffic that is to be routed to an RLC layer. For example, using these techniques, the SeNB-AP 142 distinguishes between uplink traffic over the WLAN air interface 148 that is to be routed to the router 144 from uplink traffic over the WLAN air interface 132 that is to be routed to the RLC layer.

In all communications involving radio bearers, each radio bearer is supported by one or more RLC entities that are configured according to the quality of service (QoS) that is associated with the radio bearer. A single apparatus may support multiple RLC entities. Each RLC entity is associated with a logical channel, and the logical channel is identified by a logical channel identifier (LCID) that is established during radio bearer setup. In those cases where the traffic from a radio bearer is passed to an LTE MAC layer, the LCID is included in the LTE MAC header generated by an LTE MAC layer at a transmitter apparatus. The LTE MAC header thus conveys an indication of the logical channel to which traffic belongs, so that the traffic will be routed from the LTE MAC layer at the receiver apparatus to the correct RLC entity at the receiver apparatus.

Currently there is no mechanism within the IEEE 802.11 MAC/PHY framework or within the IEEE 802.2 LLC framework to convey an indication of the logical channel to which traffic belongs. This document proposes that an IEEE 802.11 MAC frame (or contents thereof) at the transmitter apparatus includes information from which the logical channel carrying traffic can be identified, so that the receiver apparatus, when unpacking the IEEE 802.11 MAC frame (or contents thereof), is able to route the traffic to the appropriate RLC entity associated with the logical channel.

IEEE 802.11 MAC Addresses

According to a first aspect, a modified IEEE 802.11 MAC layer is positioned between the IEEE 802.11 PHY layer and the RLC layer. IEEE 802.11 MAC addresses are used to distinguish between logical channels, or to distinguish between conventional uplink WLAN traffic and uplink WLAN traffic to be routed to the RLC layer, or both.

Figure 2A:
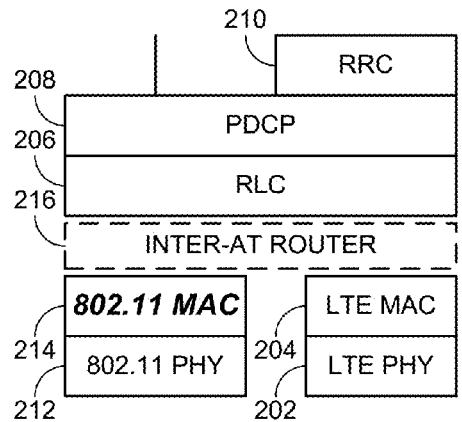
FIGS. 2A-2H illustrate example protocol stacks according to a first second aspect.

FIG. 2A illustrates an example protocol stack 200 suitable for implementation by the UE 24, by the eNB 20 illustrated in FIG. 1A and by the MeNB 80 illustrated in FIG. 1D and FIG. 1G. As is typical for an e-UTRA protocol stack, the protocol stack 200 includes an LTE PHY layer 202, an LTE MAC layer 204, an RLC layer 206, a PDCP layer 208, and an RRC layer 210. The main services and functions of the RRC layer 210 include establishment, configuration, maintenance and release of point-to-point radio bearers. Although not illustrated as such, multiple RLC entities and multiple PDCP entities correspond to the multiple radio bearers over which traffic is carried. The protocol stack 200 includes an IEEE 802.11 PHY layer 212 and a modified IEEE 802.11 MAC layer 214 to facilitate WLAN communications. The determination to route traffic from an RLC entity to the LTE MAC/PHY layers (so that the traffic is carried over an e-UTRA air interface) or to the IEEE 802.11 MAC/PHY layers (so that the traffic is carried over a WLAN air interface) may be handled by an optional inter-access technology (inter-AT) router 216. The inter-AT router 216, if present, interfaces to the multiple RLC entities, to the LTE MAC layer 204 and to the modified IEEE 802.11 MAC layer 214. Routing design is beyond the scope of this document. Functionality of the modified IEEE 802.11 MAC layer 214 is described below.

Figure 2B:
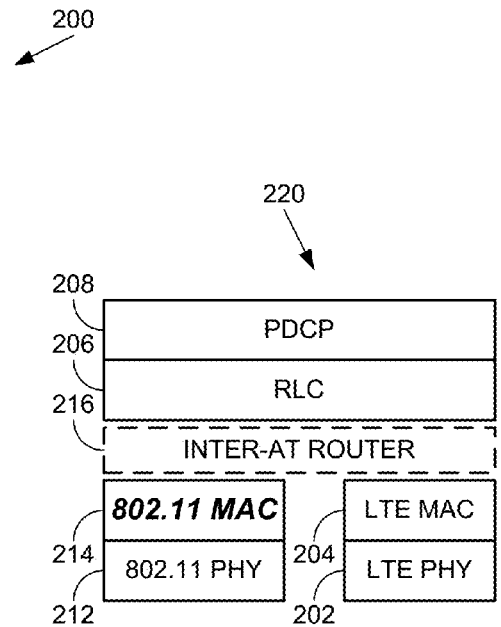

FIG. 2B illustrates an example protocol stack 220 suitable for implementation by the SeNB 134 illustrated in FIG. 1G. The protocol stack 220 differs from the protocol stack 200 illustrated in FIG. 2A in that the RRC layer 210 is absent from the protocol stack 220.

Figure 2C:
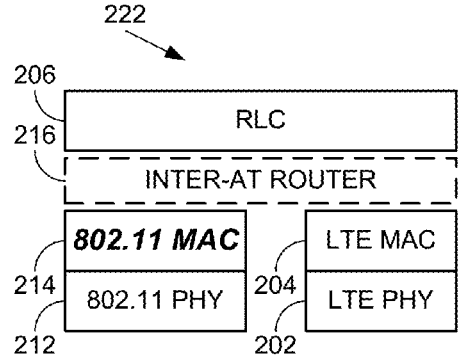

FIG. 2C illustrates an example protocol stack 222 suitable for implementation by the SeNB 84 illustrated in FIG. 1D. The protocol stack 222 differs from the protocol stack 200 illustrated in FIG. 2A in that the PDCP layer 208 and the RRC layer 210 are absent from the protocol stack 226. Rather, the multiple RLC entities in the protocol stack 226 (corresponding to multiple logical channels) interface to corresponding multiple PDCP entities in the MeNB.

Figure 2D:
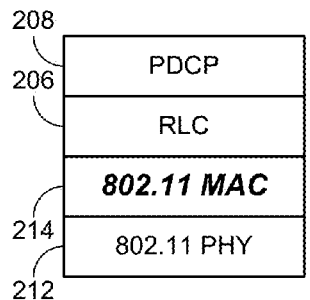

FIG. 2D illustrates an example protocol stack 224 suitable for implementation by the SeNB 112 illustrated in FIG. 1F. The protocol stack 224 includes the IEEE 802.11 PHY layer 212 and the modified IEEE 802.11 MAC layer 214 to facilitate WLAN communications. The protocol stack 224 further includes the RLC layer 206 above the modified IEEE 802.11 MAC layer 214 and the PDCP layer 208 above the RLC layer 206. Although not illustrated as such, multiple RLC entities and multiple PDCP entities correspond to multiple radio bearers over which traffic is carried.

Figure 2E:
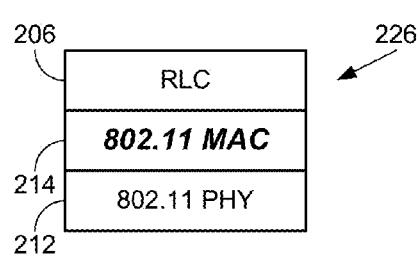

FIG. 2E illustrates an example protocol stack 226 suitable for implementation by the SeNB 64 illustrated in FIG. 1C. The protocol stack 226 differs from the protocol stack 224 illustrated in FIG. 2D in that the PDCP layer 208 is absent from the protocol stack 226. Rather, the multiple RLC entities in the protocol stack 226 (corresponding to multiple logical channels) interface to corresponding PDCP entities in the MeNB.

Figure 2F:
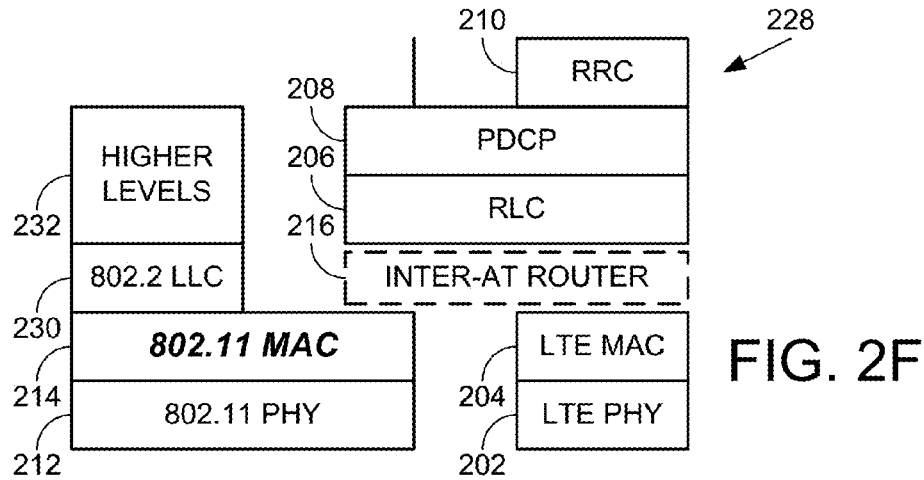

FIG. 2F illustrates an example protocol stack 228 suitable for implementation by the eNB-AP 36 illustrated in FIG. 1B. The protocol stack 228 differs from the protocol stack 200 illustrated in FIG. 2A in that the protocol stack 228, for handling of conventional WLAN traffic, includes an IEEE 802.2 LLC layer 230 above the modified IEEE 802.11 MAC layer 214 and includes higher levels 232 above the IEEE 802.2 LLC layer 230.

Figure 2G:
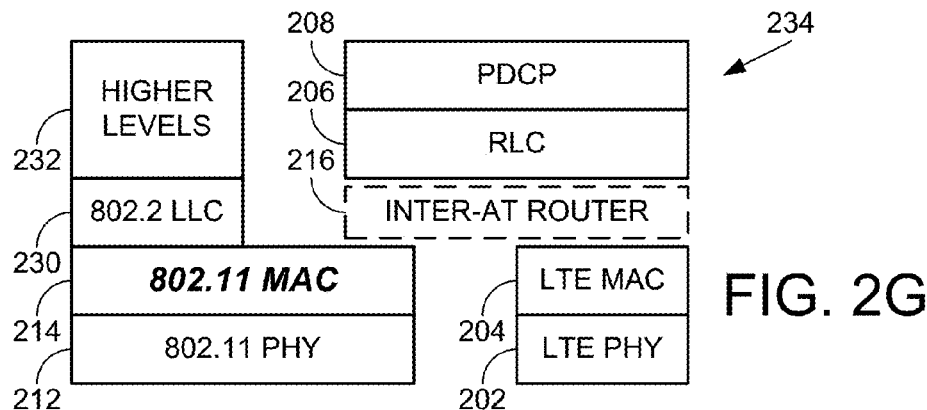

FIG. 2G illustrates an example protocol stack 234 suitable for implementation by the SeNB-AP 142 illustrated in FIG. 1H. The protocol stack 234 differs from the protocol stack 228 illustrated in FIG. 2F in that the RRC layer 210 is absent from the protocol stack 234.

Figure 2H:
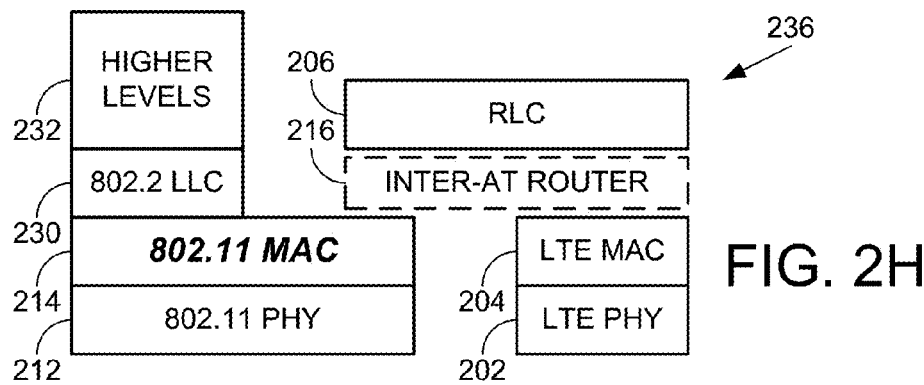

FIG. 2H illustrates an example protocol stack 236 suitable for implementation by the SeNB-AP 92 illustrated in FIG. 1E. The protocol stack 236 differs from the protocol stack 228 illustrated in FIG. 2F in that the PDCP layer 208 and the RRC layer 210 are absent from the protocol stack 236. Rather, the multiple RLC entities in the protocol stack 236 (corresponding to multiple logical channels) interface to corresponding PDCP entities in the MeNB.

The header of a downlink IEEE 802.11 MAC data frame includes three addresses. A receiver address field stores the IEEE 802.11 MAC address of the UE, a transmitter address field stores the basic service set identifier (BSSID) of the access point (AP), and a source address field stores the IEEE 802.11 MAC address of the original source that initially created and transmitted the frame.

The header of an uplink IEEE 802.11 MAC data frame includes three addresses. A receiver address field stores the BSSID of the AP, a transmitter address field stores the IEEE 802.11 MAC address of the UE, and a destination address field stores the IEEE 802.11 MAC address of the final destination to receive the frame.

In a first variant of the first aspect, the source address field of a downlink IEEE 802.11 MAC data frame and the destination address field of an uplink IEEE 802.11 MAC data frame are repurposed to indicate to which RLC entity the traffic belongs. In other words, the logical channel carrying the traffic is associated with values stored in the source address field (for downlink) and in the destination address field (for uplink) of the IEEE 802.11 MAC header handled by the modified IEEE 802.11 MAC layer. During setup of the radio bearer, a source address value for the downlink and a destination address value for the uplink, both associated with the logical channel, are communicated to the receiver apparatus. For example, the source address value for the downlink and the destination address value for the uplink associated with the logical channel may be included in a RadioResourceConfigDedicated information element of an RRCConnectionSetup message or an RRCConnection-Reconfiguration message. Such messages are generated by the component implementing the RRC layer 210. The source address value may differ from the destination address value or may be identical to the destination address value. In the UE 24 acting as the transmitter apparatus for uplink traffic, a component implementing the modified IEEE 802.11 MAC layer 214 generates an IEEE 802.11 MAC header that includes the destination address value associated with the logical channel in its destination address field. In the eNB or MeNB or SeNB or SeNB-AP acting as the transmitter apparatus for downlink traffic, a component implementing the modified IEEE 802.11 MAC layer 214 generates an IEEE 802.11 MAC header that includes the source address value associated with the logical channel in its source address field.

The receiver apparatus for uplink traffic may be an access point that handles conventional WLAN traffic (for example, the eNB-AP 36, the SeNB-AP 92, and the SeNB-AP 142). In that case, the component implementing the modified IEEE 802.11 MAC layer 214 in the receiver apparatus inspects the value in the destination address field of the IEEE 802.11 MAC header. In the event that the value in the destination address field corresponds to a logical channel, the component forwards the payload to the corresponding RLC entity for processing. In the event that the value in the destination address field does not correspond to a logical channel, the component forwards the payload to the higher levels 232 for processing as conventional uplink WLAN traffic.

Alternatively, all WLAN traffic received by the receiver apparatus may be routed to the RLC layer. In that case, the component implementing the modified IEEE 802.11 MAC layer 214 in the receiver apparatus inspects the value in the destination address field (for uplink traffic) or in the source address field (for downlink traffic) of the IEEE 802.11 MAC header and uses that value to determine to which RLC entity to forward the payload for processing.

An example format of an IEEE 802.11 MAC frame used in downlink data communications is shown in TABLE 1 below.

TABLE 1 example IEEE 802.11 MAC frame used in downlink

| Frame Control | Duration/ ID | Receiver Address UE MAC address | Transmitter Address BSSID | Source Address value associated with logical channel | Seq CTL | Frame Body | FCS |
|---|---|---|---|---|---|---|---|
| IEEE 802.11 MAC header | | | | | | contains RLC PDU | |

An example format of an IEEE 802.11 MAC frame used in uplink data communications is shown in TABLE 2 below.

TABLE 2 example IEEE 802.11 MAC frame used in uplink

| Frame Control | Duration/ ID | Receiver Address AP BSSID | Transmitter Address UE MAC address | Destination Address value associated with logical channel | Seq CTL | Frame Body | FCS |
|---|---|---|---|---|---|---|---|
| IEEE 802.11 MAC header | | | | | | contains RLC PDU | |

In a second variant of the first aspect, an eNB (or eNB-AP or MeNB or SeNB or SeNB-AP) may be implemented with multiple BSSIDs. The combination of a UE IEEE 802.11 MAC address and a BSSID is used to uniquely identify a particular logical channel amongst those configured for a particular UE. With reference to TABLE 1, in the case of the downlink, the receiver apparatus will only process frames for which the Receiver Address corresponds to the IEEE 802.11 MAC address of the UE, the UE will then read the Transmitter Address value (BSSID) value to determine to which RLC entity the payload should be forwarded. With reference to TABLE 2, in the case of the uplink, the eNB will use the Transmitter Address value (UE IEEE 802.11 MAC address) to determine the UE with which the frame is associated and will then use the Receiver Address value (BSSID) to determine the particular logical channel with which the payload is associated. During setup of the radio bearer, the BSSID associated with the logical channel is communicated from the eNB to the UE. For example, the BSSID associated with the logical channel may be included in a RadioResourceConfigDedicated information element of an RRCConnectionSetup message or an RRCConnection-Reconfiguration message. An eNB may have up to 16 BSSIDs allocated for the purpose of distinguishing between logical channels, because the maximum number of radio bearers supported on LTE is 16.

In a third variant of the first aspect, the source address field of a downlink IEEE 802.11 MAC data frame and the destination address field of an uplink IEEE 802.11 MAC data frame are repurposed to identify traffic that is to be routed to the RLC layer (thus distinguishing the traffic from conventional WLAN traffic). During setup of the radio bearer, a source address value for the downlink and a destination address value for the uplink, both indicative of traffic to be routed to the RLC layer, are communicated to the receiver apparatus. For example, the source address value for the downlink and the destination address value for the uplink associated with the logical channel may be included in a RadioResourceConfigDedicated information element of an RRCConnectionSetup message or an RRC-ConnectionReconfiguration message. Such messages are generated by the component implementing the RRC layer 210. The source address value may differ from the destination address value or may be identical to the destination address value. This third variant may be combined with techniques described below for a second aspect, a third aspect, or a fourth aspect in order to distinguish between logical channels.

LLC or LLC/SNAP

According to a second aspect, a modified IEEE 802.2 LLC layer is positioned between the IEEE 802.11 MAC layer and the RLC layer. A component implementing the modified IEEE 802.2 LLC layer is configured to operate always in the Unacknowledged Connectionless Mode (defined in section 2.2. of the IEEE 802.2 specification). The component, thus configured, provides for transfer of link layer service data units without the establishment of a data link level connection.

Figure 3A:
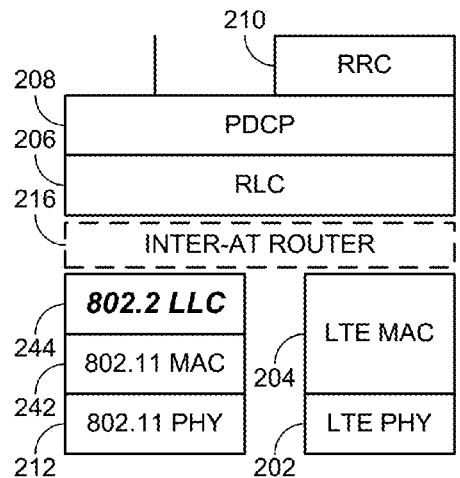
FIGS. 3A-3H illustrate example protocol stacks according to a second aspect.

FIG. 3A illustrates an example protocol stack 240 suitable for implementation by the UE 24, by the eNB 20 illustrated in FIG. 1A and by the MeNB 80 illustrated in FIG. 1D and FIG. 1G. As is typical for an e-UTRA protocol stack, the protocol stack 240 includes the LTE PHY layer 202, the LTE MAC layer 204, the RLC layer 206, the PDCP layer 208, and the RRC layer 210. Although not illustrated as such, multiple RLC entities and multiple PDCP entities correspond to the multiple radio bearers over which traffic is carried. The protocol stack 240 includes the IEEE 802.11 PHY layer 212 and an IEEE 802.11 MAC layer 242 to facilitate WLAN communications. The protocol stack 240 further includes a modified IEEE 802.2 LLC layer 244. Functionality of the modified IEEE 802.2 LLC layer 244 is described below. The determination to route traffic from a logical channel to the LTE MAC/PHY layers (so that the traffic is carried over an e-UTRA air interface) or to the IEEE 802.11 MAC/PHY layers (so that the traffic is carried over a WLAN air interface) may be handled by the optional inter-AT router 216. The inter-AT router 216, if present, interfaces to the multiple RLC entities, to the LTE MAC layer 204 and to the modified IEEE 802.2 LLC layer 244. Routing design is beyond the scope of this document.

Figure 3B:
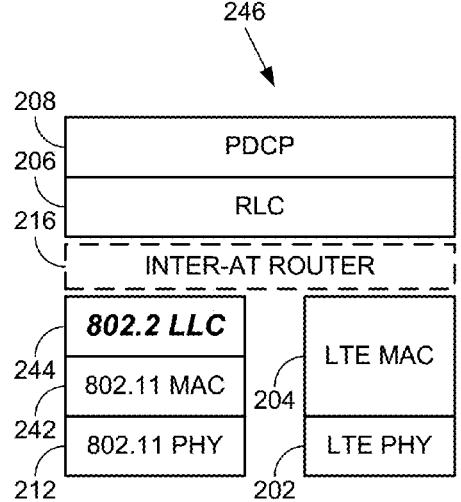

FIG. 3B illustrates an example protocol stack 246 suitable for implementation by the SeNB 134 illustrated in FIG. 1G. The protocol stack 246 differs from the protocol stack 240 illustrated in FIG. 3A in that the RRC layer 210 is absent from the protocol stack 246.

Figure 3C:
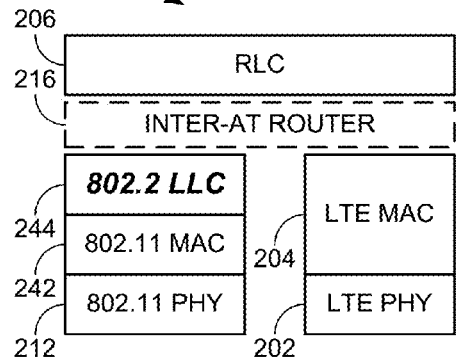

FIG. 3C illustrates an example protocol stack 248 suitable for implementation by the SeNB 84 illustrated in FIG. 1D. The protocol stack 248 differs from the protocol stack 240 illustrated in FIG. 3A in that the PDCP layer 208 and the RRC layer 210 are absent from the protocol stack 248. Rather, the multiple RLC entities in the protocol stack 248 (corresponding to multiple logical channels) interface to corresponding PDCP entities in the MeNB.

Figure 3D:
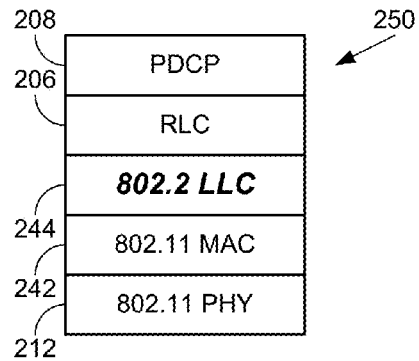

FIG. 3D illustrates an example protocol stack 250 suitable for implementation by the SeNB 112 illustrated in FIG. 1F. The protocol stack 250 includes the IEEE 802.11 PHY layer 212 and the IEEE 802.11 MAC layer 242 to facilitate WLAN communications. The protocol stack 250 includes the modified IEEE 802.2 LLC layer 244 above the IEEE 802.11 MAC layer 242. The protocol stack 250 further includes the RLC layer 206 above the modified IEEE 802.2 LLC layer 244 and the PDCP layer 208 above the RLC layer 206. Although not illustrated as such, multiple PDCP entities correspond to multiple radio bearers over which traffic is carried.

Figure 3E:
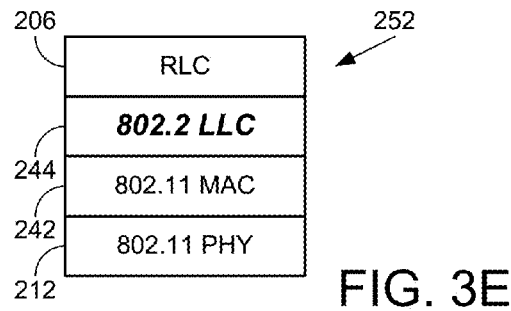

FIG. 3E illustrates an example protocol stack 252 suitable for implementation by the SeNB 64 illustrated in FIG. 1C. The protocol stack 252 differs from the protocol stack 250 illustrated in FIG. 3D in that the PDCP layer 208 is absent from the protocol stack 252. Rather, the multiple RLC entities in the protocol stack 252 (corresponding to multiple logical channels) interface to corresponding PDCP entities in the MeNB.

Figure 3F:
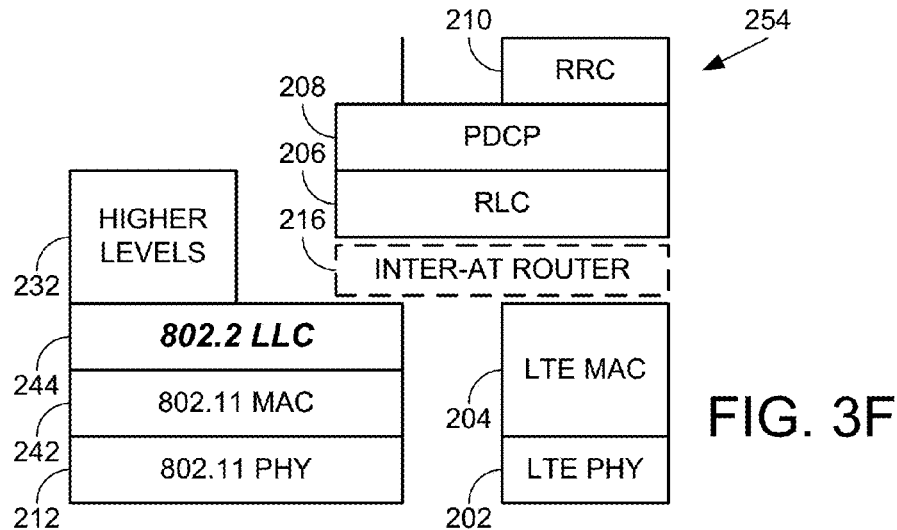

FIG. 3F illustrates an example protocol stack 254 suitable for implementation by the eNB-AP 36 illustrated in FIG. 1B. The protocol stack 254 differs from the protocol stack 240 illustrated in FIG. 3A in that the protocol stack 254, for handling of conventional WLAN traffic, includes the higher levels 232 above the modified IEEE 802.2 LLC layer 244.

Figure 3G:
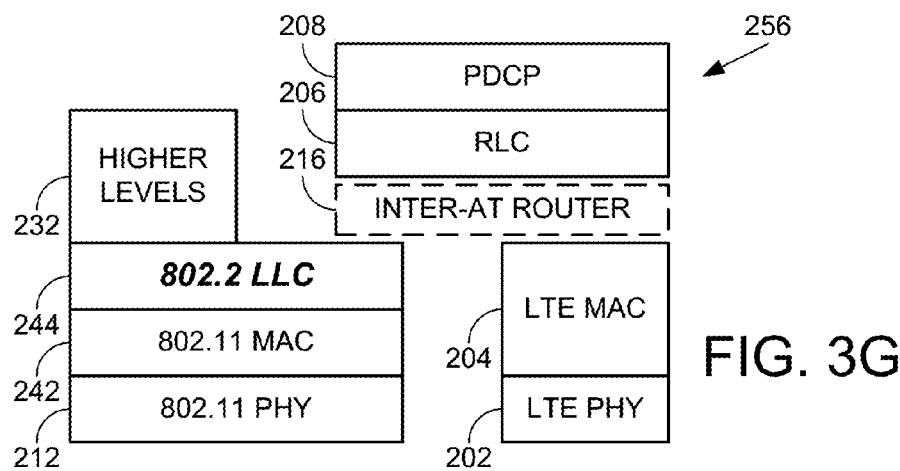

FIG. 3G illustrates an example protocol stack 256 suitable for implementation by the SeNB-AP 142 illustrated in FIG. 1H. The protocol stack 256 differs from the protocol stack 254 illustrated in FIG. 3F in that the RRC layer 210 is absent from the protocol stack 256.

Figure 3H:
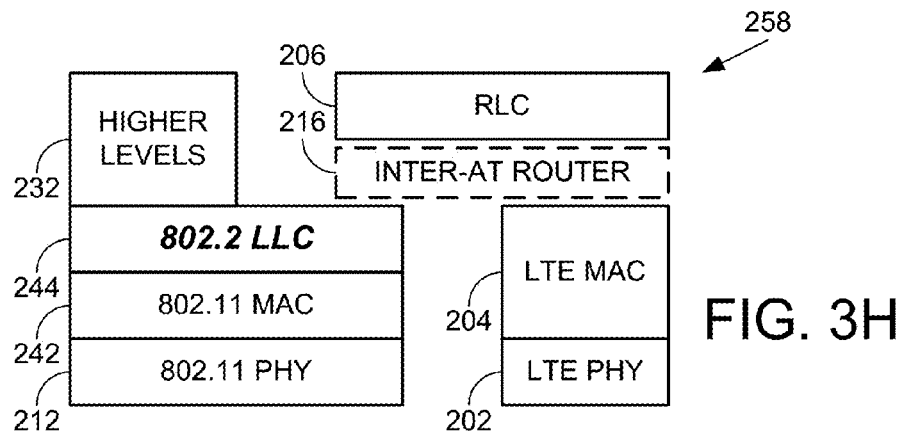

FIG. 3H illustrates an example protocol stack 258 suitable for implementation by the SeNB-AP 92 illustrated in FIG. 1E. The protocol stack 258 differs from the protocol stack 254 illustrated in FIG. 3F in that the PDCP layer 208 and the RRC layer 210 are absent from the protocol stack 258. Rather, the multiple RLC entities in the protocol stack 258 (corresponding to multiple logical channels) interface to corresponding multiple PDCP entities in the MeNB.

A first variant of the second aspect makes use of local assignment of LLC service access point (SAP) fields of an IEEE 802.2 LLC header. One portion of the LLC address space is reserved for assignment to various network layer protocols, as recorded by the IEEE Registration Authority. The other portion of the LLC address space is available for local assignment. Conventionally, users can agree to use locally assigned LLC SAPs for either an entity of communication or a type of communication.

In the first variant, the LLC SAP fields of an IEEE 802.2 LLC header are repurposed to indicate to which RLC entity the traffic belongs. In other words, the logical channel carrying the traffic is associated with values stored in the LLC SAP fields of the IEEE 802.2 LLC header handled by the modified IEEE 802.2 LLC layer. During setup of the radio bearer, a Destination SAP (DSAP) value and a Source SAP (SSAP) value, both associated with the logical channel, are communicated to the receiver apparatus. For example, the DSAP value and the SSAP value associated with the logical channel may be included in a RadioResourceConfigDedicated information element of an RRCConnectionSetup message or an RRCConnectionReconfiguration message. Such messages are generated by the component implementing the RRC layer 210. In the transmitter apparatus, a component implementing the modified IEEE 802.2 LLC layer 244 generates the IEEE 802.2 LLC header that includes the DSAP value associated with the logical channel in its DSAP field and that includes the SSAP value associated with the logical channel in its SSAP field. Alternatively, a single LLC SAP value associated with the logical channel is communicated to the receiver apparatus. For example, the single LLC SAP value associated with the logical channel may be included in a RadioResourceConfigDedicated information element of an RRCConnectionSetup message or an RRCConnectionReconfiguration message.

In the transmitter apparatus, a component implementing the modified IEEE 802.2 LLC layer 244 generates the IEEE 802.2 LLC header that includes the single LLC SAP value associated with the logical channel in its DSAP field and in its SSAP field.

The receiver apparatus may be an access point that handles conventional WLAN traffic (for example, the eNB-AP 36, the SeNB-AP 92, and the SeNB-AP 142). In that case, the component implementing the modified IEEE 802.2 LLC layer 244 in the receiver apparatus inspects the values in the DSAP and SSAP fields of the IEEE 802.2 LLC header. In the event that the values in the DSAP and the SSAP fields (which may be identical or non-identical) correspond to a logical channel, the component forwards the payload to the corresponding RLC entity for processing. In the event that the values in the DSAP and SSAP fields do not correspond to a logical channel, or are determined to correspond to known higher level protocols, the component forwards the payload to the higher levels 232 for processing as conventional uplink WLAN traffic.

Alternatively, all WLAN traffic received by the receiver apparatus may be routed to the RLC layer. In that case, the component implementing the modified IEEE 802.2 LLC layer 244 in the receiver apparatus inspects the values in the DSAP and SSAP fields of the IEEE 802.2 LLC header and uses those values, which may be identical or non-identical, to determine to which RLC entity to forward the payload for processing.

An example format of an LLC PDU is shown in TABLE 3 below.

TABLE 3

IEEE 802.2 LLC PDU with logical channel value in LSAP

| DSAP value associated with logical channel 1 octet | SSAP (different) value associated with logical channel 1 octet | CTL 03 1 octet | Payload N octets |
|---|---|---|---|
| LLC PDU header LLC PDU | | | LLC SDU |

In the example format of the LLC PDU shown in TABLE 3, the LLC PDU consists of an LLC PDU header, followed by an LLC service data unit (SDU). The LLC SDU consists of the payload, which is the RLC PDU. The size of the payload, N octets, will depend on the higher level protocol. The LLC PDU header consists of a 1-octet DSAP field storing a value associated with the logical channel, followed by a 1-octet SSAP field storing a value associated with the logical channel, followed by a 1-octet control (CTL) field. The CTL field may have the value '03' to indicate an Unnumbered Information type, however any information-carrying LLC PDU type is acceptable.

A second variant of the second aspect makes use of a sub-network access protocol (SNAP). A SNAP protocol data unit (PDU) consists of a 3-octet organizationally unique identifier (OUI) field, a 2-octet Protocol Type field, and an N-octet Protocol Data field, where N is the size of the payload, and depends on the higher level protocol. Conventionally, the Protocol Type field is used to distinguish between different higher-layer protocols from the organization identified in the OUI field. A SNAP PDU is preceded by an LLC PDU header, which consists of a 1-octet Destination SAP (DSAP) address field, followed by a 1-octet Source SAP (SSAP) address field, followed by a 1-octet Control (CTL) field. The DSAP address field and the SSAP address field each have the value '0xAA' or '0xAB' to indicate the presence of the SNAP PDU. The CTL field may have the value '03' to indicate an Unnumbered Information type, however any information-carrying LLC PDU type is acceptable.

In the second variant, the Protocol Type field is repurposed to indicate to which RLC entity the traffic belongs. In other words, the logical channel carrying the traffic is associated with a value stored in the Protocol Type field of the SNAP PDU handled by the modified IEEE 802.2 LLC layer. During setup of the radio bearer, a value associated with the logical channel is communicated to the receiver apparatus. For example, the value associated with the logical channel may be included in a RadioResourceConfigDedicated information element of an RRCConnectionSetup message or an RRCConnectionReconfiguration message.

In the transmitter apparatus, a component implementing the modified IEEE 802.2. LLC layer 244 generates the SNAP PDU that includes a new OUI value assigned by the IEEE Registration Authority for 3GPP use and that includes in the Protocol Type field of the SNAP PDU the value associated with the logical channel. The component implementing the modified IEEE 802.2 LLC layer 244 generates an IEEE 802.2 LLC header that indicates presence of the SNAP PDU.

The receiver apparatus may be an access point that handles conventional WLAN traffic (for example, the eNB-AP 36, the SeNB-AP 92, and the SeNB-AP 142). In that case, the component implementing the modified IEEE 802.2 LLC layer 244 inspects the value in the OUI field and the value in the Protocol Type field of the SNAP PDU. In the event that the OUI field has the new OUI value assigned for 3GPP use, the component determines from the value in the Protocol Type field to which RLC entity to forward the Protocol Data for processing. In the event that the OUI field has a value other than the new OUI value assigned for 3GPP use, the component forwards the Protocol Data to the higher levels 232 for processing as conventional uplink WLAN traffic.

Alternatively, all WLAN traffic received by the receiver apparatus may be routed to the RLC layer. In that case, the component implementing the modified IEEE 802.2 LLC layer 244 inspects the value in the Protocol Type field of the SNAP PDU and uses that value to determine to which RLC entity to forward the Protocol Data for processing.

An example format of an LLC PDU is shown in TABLE 4 below.

TABLE 4

IEEE 802.2 LLC PDU with 3GPP Specific OUI and logical channel value in SNAP Protocol Type

| DSAP 0xAA 1 octet | SSAP 0xAA 1 octet | CTL 03 1 octet | OUI 3GPP-specific value 3 octets | Protocol Type value associated with logical channel 2 octets | Protocol Data N octets |
|---|---|---|---|---|---|
| LLC PDU header | | | SNAP PDU | | |
| LLC PDU | | | | | |

Upper LTE MAC and Lower LTE MAC

According to a third aspect, the LTE MAC layer is divided into an upper LTE MAC layer and a lower LTE MAC layer. The upper LTE MAC layer is positioned between the IEEE 802.11 MAC layer and the RLC layer, and also interfaces to the lower LTE MAC layer if the lower LTE MAC layer is present. According to the third aspect, a logical channel identifier (LCID) is included in an IEEE 802.11 MAC frame, the LCID identifying the logical channel carrying the traffic.

Figure 4A:
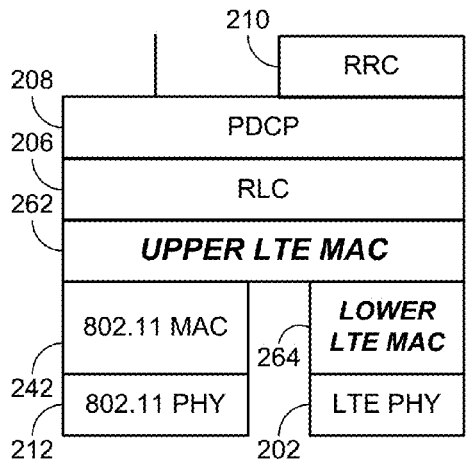
FIGS. 4A-4H illustrate example protocol stacks according to a third aspect.

FIG. 4A illustrates an example protocol stack 260 suitable for implementation by the UE 24, by the eNB 20 illustrated in FIG. 1A and by the MeNB 80 illustrated in FIG. 1D and FIG. 1G. As is typical for an e-UTRA protocol stack, the protocol stack 260 includes the LTE PHY layer 202, the RLC layer 206, the PDCP layer 208, and the RRC layer 210. Although not illustrated as such, multiple PDCP entities correspond to the multiple radio bearers over which traffic is carried. In contrast to a typical e-UTRA protocol stack, the protocol stack 260 includes an upper LTE MAC layer 262 and a lower LTE MAC layer 264. The protocol stack 260 includes the IEEE 802.11 PHY layer 212 and the IEEE 802.11 MAC layer 242 to facilitate WLAN communications. Functionality of the upper LTE MAC layer 262 and functionality of the lower LTE MAC layer 264 are described below.

Figure 4B:
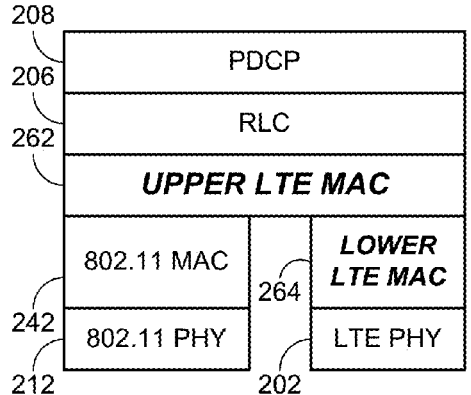

FIG. 4B illustrates an example protocol stack 266 suitable for implementation by the SeNB 134 illustrated in FIG. 1G. The protocol stack 266 differs from the protocol stack 260 illustrated in FIG. 4A in that the RRC layer 210 is absent from the protocol stack 266.

Figure 4C:
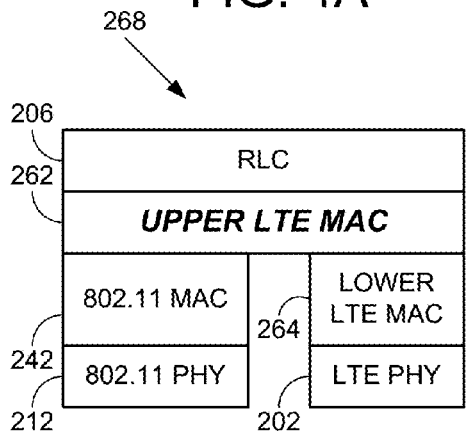

FIG. 4C illustrates an example protocol stack 268 suitable for implementation by the SeNB 84 illustrated in FIG. 1D. The protocol stack 268 differs from the protocol stack 260 illustrated in FIG. 4A in that the PDCP layer 208 and the RRC layer 210 are absent from the protocol stack 268. Rather, the multiple RLC entities in the protocol stack 268 (corresponding to multiple logical channels) interface to corresponding multiple PDCP entities in the MeNB.

Figure 4D:
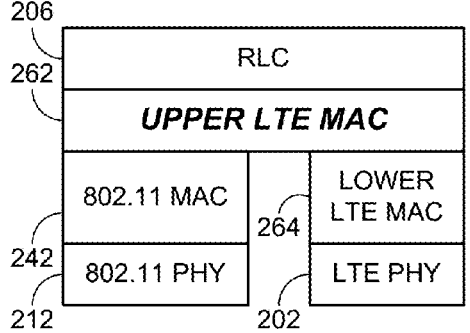

FIG. 4D illustrates an example protocol stack 270 suitable for implementation by the SeNB 112 illustrated in FIG. 1F. The protocol stack 270 includes the IEEE 802.11 PHY layer 212 and the IEEE 802.11 MAC layer 242 to facilitate WLAN communications. The protocol stack 270 includes the upper LTE MAC layer 262 above the IEEE 802.11 MAC layer 242. The protocol stack 270 further includes the RLC layer 206 above the upper LTE MAC layer 262 and the PDCP layer 208 above the RLC layer 206. Although not illustrated as such, multiple PDCP entities correspond to multiple radio bearers over which traffic is carried.

Figure 4E:
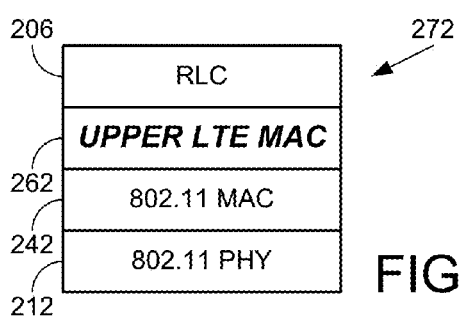

FIG. 4E illustrates an example protocol stack 272 suitable for implementation by the SeNB 64 illustrated in FIG. 1C. The protocol stack 272 differs from the protocol stack 270 illustrated in FIG. 4D in that the PDCP layer 208 is absent from the protocol stack 272. Rather, the multiple RLC entities in the protocol stack 272 (corresponding to multiple logical channels) interface to corresponding multiple PDCP entities in the MeNB.

Figure 4F:
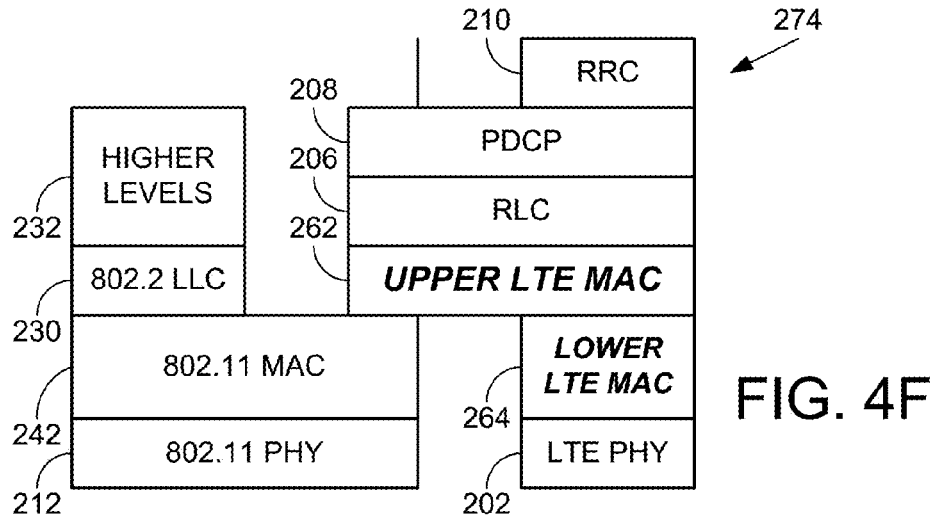

FIG. 4F illustrates an example protocol stack 274 suitable for implementation by the eNB-AP 36 illustrated in FIG. 1B. The protocol stack 274 differs from the protocol stack 260 illustrated in FIG. 4A in that the protocol stack 274, for handling of conventional WLAN traffic, includes the IEEE 802.2 LLC layer 230 above the IEEE 802.11 MAC layer 242, and the higher levels 232 above the IEEE 802.2 LLC layer 230.

Figure 4G:
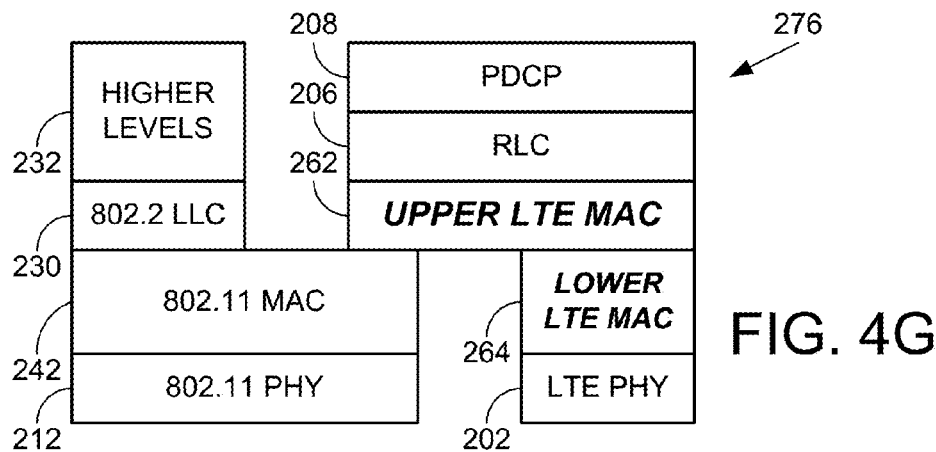

FIG. 4G illustrates an example protocol stack 276 suitable for implementation by the SeNB-AP 142 illustrated in FIG. 1H. The protocol stack 276 differs from the protocol stack 274 illustrated in FIG. 4F in that the RRC layer 210 is absent from the protocol stack 276.

Figure 4H:
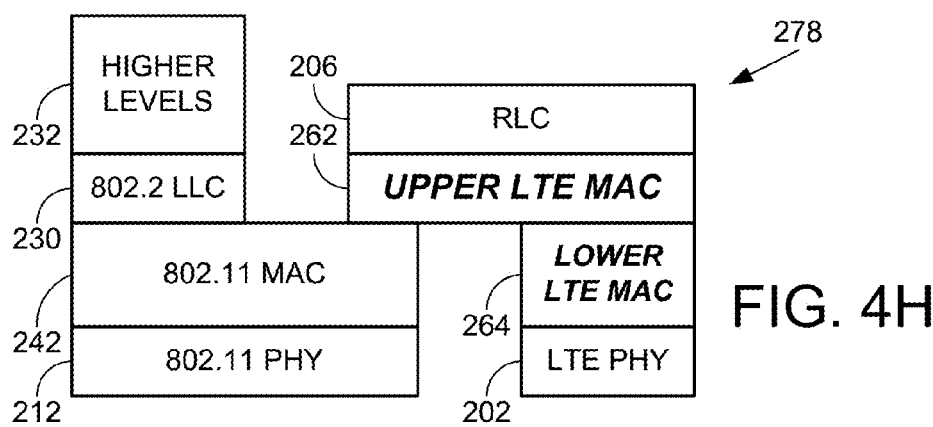

FIG. 4H illustrates an example protocol stack 278 suitable for implementation by the SeNB-AP 92 illustrated in FIG. 1E. The protocol stack 278 differs from the protocol stack 274 illustrated in FIG. 4F in that the PDCP layer 208 and the RRC layer 210 are absent from the protocol stack 278. Rather, the multiple RLC entities in the protocol stack 278 (corresponding to multiple logical channels) interface to corresponding multiple PDCP entities in the MeNB.

Conventionally, the component implementing the IEEE 802.11 MAC layer in a receiver apparatus will forward the payload of the IEEE 802.11 MAC frame to a component implementing an IEEE 802.2 LLC layer. However, in the protocol stacks illustrated in FIG. 4A and FIGS. 4C-4E, the IEEE 802.11 MAC layer 242 is configured to forward the payload of received IEEE 802.11 MAC frames to the upper LTE MAC layer 262. In the protocol stack 250 illustrated in FIG. 4B, the IEEE 802.11 MAC layer 242 is configured to distinguish between conventional uplink WLAN traffic (so that the payload of those received IEEE 802.11 MAC frames are forwarded to the IEEE 802.2 LLC layer 230) and uplink WLAN traffic that is to be routed to the RLC 206 (so that the payload of those received IEEE 802.11 MAC frames are forwarded to the upper LTE MAC layer 262).

In the transmitter apparatus, a component implementing the upper LTE MAC layer 262 builds a PDU that forms the payload of the IEEE 802.11 MAC frame, where the PDU includes the LCID corresponding to the logical channel.

Example formats of the PDU built by the component implementing the upper LTE MAC layer 262 are shown in TABLE 5, TABLE 6 and TABLE 7.

TABLE 5 example of IEEE 802.11 MAC payload
built by upper LTE MAC layer

| R/R/E/LCID sub-header | LTE MAC SDU |
| --- | --- |
| LTE MAC header | LTE MAC payload |
| IEEE 802.11 MAC payload | |

TABLE 6 example of IEEE 802.11 MAC payload
built by upper LTE MAC layer

| R/R/E/ LCID sub-header | R/R/E/ LCID/F/L sub-header | LTE MAC control element | LTE MAC SDU |
| --- | --- | --- | --- |
| LTE MAC header | | LTE MAC payload | |
| IEEE 802.11 MAC payload | | | |

TABLE 7 example of IEEE 802.11 MAC payload
built by upper LTE MAC layer

| R/R/E/ LCID sub-header | R/R/E/ LCID/F/L sub-header | R/R/E/ LCID sub-header | LTE MAC SDU | LTE MAC SDU | LTE MAC SDU |
| --- | --- | --- | --- | --- | --- |
| LTE MAC header | | | LTE MAC payload | | |
| IEEE 802.11 MAC payload | | | | | |

In the example format shown in TABLE 5, a single LTE MAC SDU (which is the RLC PDU) forms the LTE MAC payload, and a single LTE MAC PDU sub-header forms the LTE MAC header. A single logical channel carries the traffic of the single LTE MAC SDU, and therefore a single LCID is included in the IEEE 802.11 MAC payload.

In the example format shown in TABLE 6, the LTE MAC payload is formed from an LTE MAC control element and a single LTE MAC SDU (which is the RLC PDU), and the LTE MAC header consists of two LTE MAC PDU sub-headers, one for the LTE MAC control element and one for the LTE MAC SDU. Two different LCIDs (one for the LTE MAC control element and one for the logical channel associated with the LTE MAC SDU) are included in the IEEE 802.11 MAC payload.

In the example format shown in TABLE 7, three LTE MAC SDUs are concatenated to form the LTE MAC payload, and the LTE MAC header consists of three LTE MAC PDU sub-headers, one for each of the LTE MAC SDUs. The logical channel that carries one of the LTE MAC SDUs may be different from the logical channel that carries another of the LTE MAC SDUs, and therefore three LCIDs are included in the IEEE 802.11 MAC payload.

In general, the LTE MAC payload may be formed of none or one or more LTE MAC control elements and one or more LTE MAC SDUs. The LTE MAC header will consist of one LTE MAC PDU sub-header for each LTE MAC control element or LTE MAC SDU included in the LTE MAC payload. Each LTE MAC PDU sub-header includes a LCID for the corresponding LTE MAC control element or LTE MAC SDU.

When IEEE 802.11 technologies are used for transport, no padding is necessary in the LTE MAC header and no padding is necessary in the LTE MAC payload.

The LTE MAC PDU sub-header may be a 1-octet R/R/E/LCID sub-header or a 2-octet R/R/E/LCID/F/L sub-header. "R" represents a Reserved bit, set to "0". "E" represents a 1-bit Extension field, which is a flag indicating if more fields are present in the MAC header or not. "LCID" is a 5-bit logical channel identifier, corresponding to the logical channel. "L" represents a Length field that indicates the length of the corresponding MAC SDU or variable-sized MAC control element. "F" represents a 1-bit Format field that indicates the size of the Length field.

In the receiver apparatus, the component implementing the upper LTE MAC layer 262 inspects the LCID value(s) in the LTE MAC sub-header(s) and uses those values to determine to which RLC entity to forward each LTE MAC SDU for processing.

Functionality may be distributed between the upper LTE MAC layer 262 and the lower LTE MAC layer 264 as listed in TABLE 8.

TABLE 8 proposed distribution of MAC functions across Upper and Lower LTE MAC layers

| MAC Function | Location |
| --- | --- |
| New function: inter-AT scheduling (determines which RLC PDUs will be sent on IEEE 802.11 and which will be sent on LTE) | Upper |
| Mapping between logical channels and transport channels | Upper |
| Multiplexing of MAC SDUs from one or different logical channels | Upper |
| Demultiplexing of MAC SDUs from one or different logical channels | Upper |
| Scheduling Information Reporting | Lower or Upper |
| Error Correction through hybrid automatic repeat request (HARQ) | Lower |
| Priority Handling between UEs by means of dynamic scheduling | Upper |
| Priority Handling between logical channels of one UE | Upper |
| Logical Channel prioritization | Upper |
| Transport Format selection | Lower |
| Concatenation | Lower or Upper |
| Padding | Lower |

Figure 5:
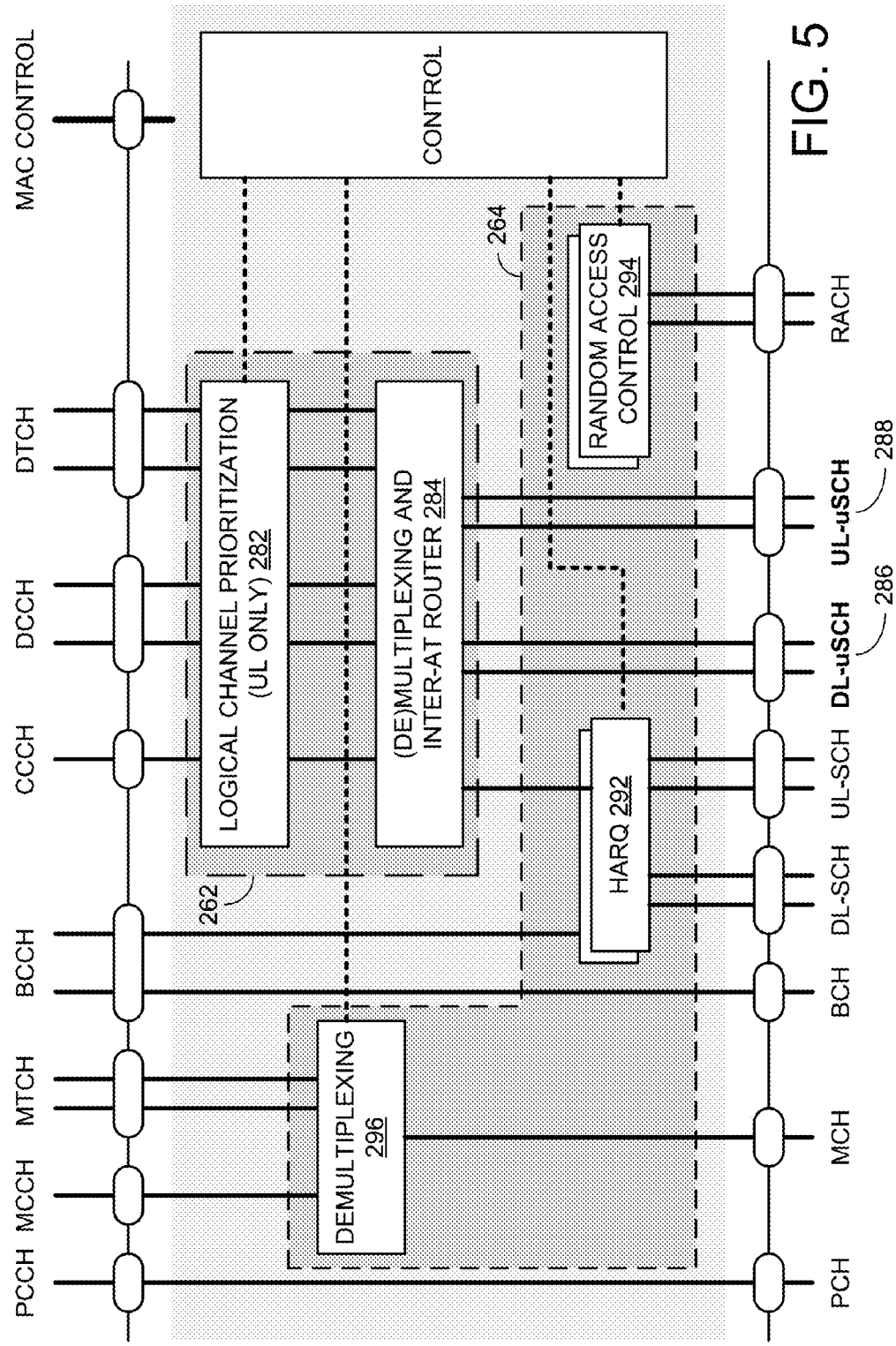
FIG. 5 illustrates user equipment (UE)-side media access control (MAC) functionality with an example breakdown of upper Long-Term Evolution (LTE) MAC layer and lower LTE MAC layer.

FIG. 5 illustrates UE-side MAC functionality with an example breakdown of upper LTE MAC layer aspects and lower LTE MAC layer aspects. In this example breakdown, the upper LTE MAC layer 262 includes logical channel prioritization functionality 282 (applicable to uplink communications) and a multiplexer/demultiplexer 284 that includes an inter-AT router (having similar or identical functionality to the inter-AT router 216). The upper LTE MAC layer 262 is coupled to the CCCH, DCCH and DTCH logical channels and to new transport channels 286 and 288. For example, the new transport channel 286 may be labeled 'DL-uSCH' to indicate that it is a shared channel to carry downlink traffic over an unlicensed carrier, and the new transport channel 288 may be labeled 'UL-uSCH' to indicate that it is a shared channel to carry uplink traffic over an unlicensed carrier. In this example breakdown, the lower LTE MAC layer 264 includes hybrid automatic repeat request (HARQ) functionality 292, random access control functionality 294, and demultiplexing 296 of the MCH transport channel to the MCCH and MTCH logical channels.

Figure 6:
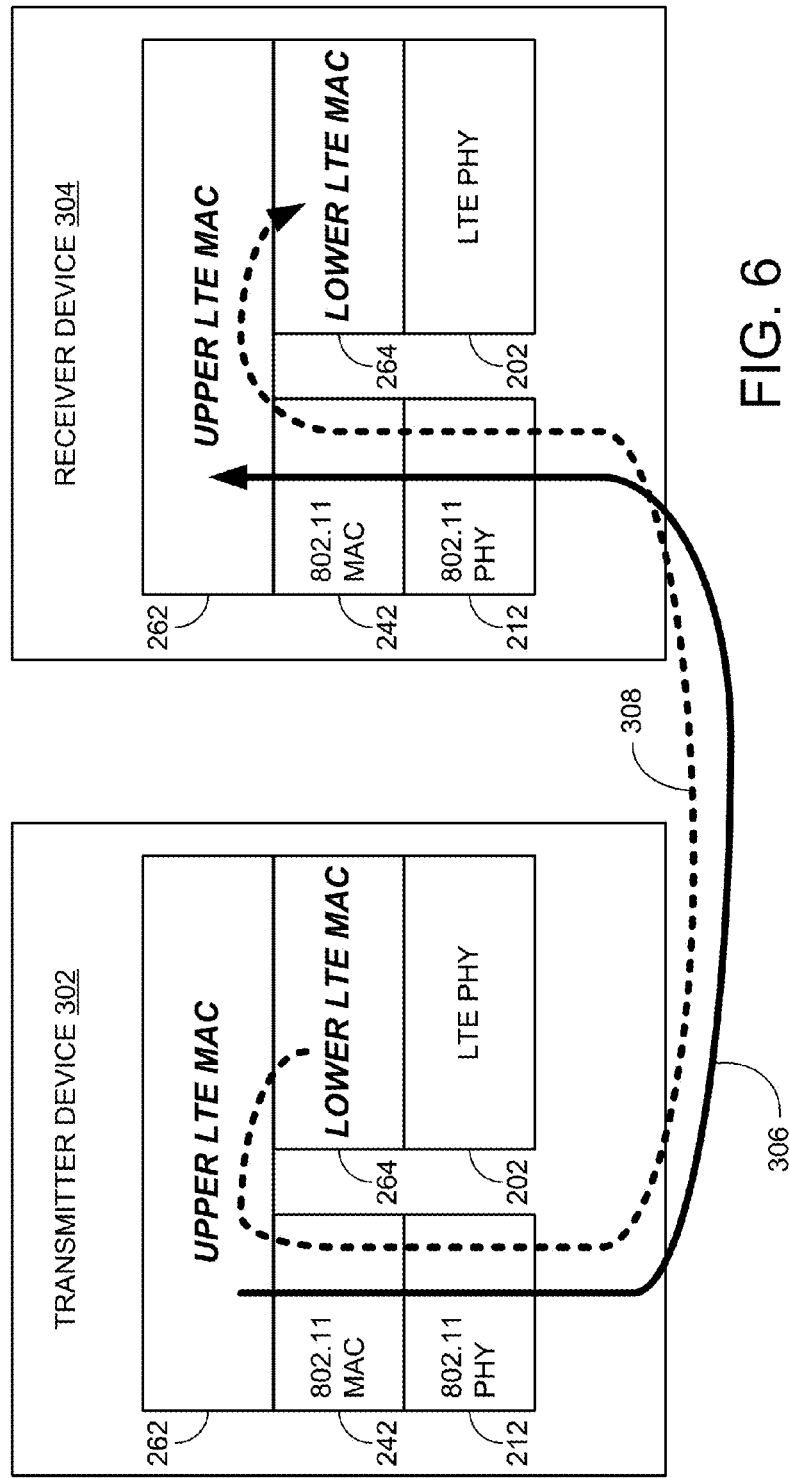
FIG. 6 illustrates flow of LTE MAC control elements.

FIG. 6 illustrates flows of LTE MAC control elements, in the event that the LTE MAC control elements are carried over a WLAN air interface rather than an e-UTRA air interface. LTE MAC control elements originating from the upper LTE MAC layer 262 implemented in a transmitter apparatus 302 are transported via the IEEE 802.11 MAC layer 242 and the IEEE 802.11 PHY layer 212 implemented in the transmitter apparatus 302, carried over a WLAN air interface, and received by the IEEE 802.11 PHY layer 212 and the IEEE 802.11 MAC layer 242 implemented in a receiver apparatus 304, then routed to the upper LTE MAC layer 262 implemented in the receiver apparatus 304. This flow is referenced 306. LTE MAC control elements originating from the lower LTE MAC layer 264 implemented in the transmitter apparatus 302 are routed up to the upper LTE MAC layer 262, then transported via the IEEE 802.11 MAC layer 242 and the IEEE 802.11 PHY layer 212 implemented in the transmitter apparatus 302, carried over the WLAN air interface, and received by the IEEE 802.11 PHY layer 212 and the IEEE 802.11 MAC layer 242 implemented in the receiver apparatus 304, then routed to the upper LTE MAC layer 262 implemented in the receiver apparatus 304 and finally routed to the lower LTE MAC layer 264 implemented in the receiver apparatus 304. This flow is referenced 308.

Hybrid Upper LTE MAC and Lower LTE MAC, with LLC or LLC/SNAP

According to a fourth aspect, the LTE MAC layer is divided into an upper LTE MAC layer and a lower LTE MAC layer, and a modified IEEE 802.2 LLC layer is positioned between the IEEE 802.11 MAC layer and the upper LTE MAC layer. The upper LTE MAC layer is positioned between the modified IEEE 802.2 LLC layer and the RLC layer, and also interfaces to the lower LTE MAC layer if the lower LTE MAC layer is present. A component implementing the modified IEEE 802.2 LLC layer is configured to operate always in the Unacknowledged Connectionless Mode (defined in section 2.2. of the IEEE 802.2 specification). The component, thus configured, provides for transfer of link layer service data units without the establishment of a data link level connection.

Figure 7A:
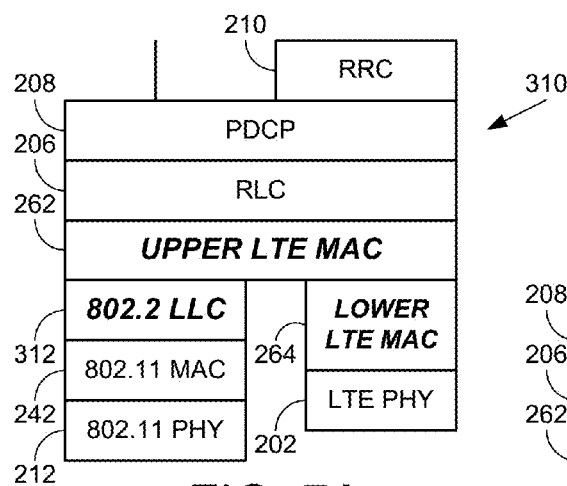
FIGS. 7A-7H illustrate example protocol stacks.

FIG. 7A illustrates an example protocol stack 310 suitable for implementation by the UE 24, by the eNB 20 illustrated in FIG. 1A and by the MeNB 80 illustrated in FIG. 1D and FIG. 1G. As is typical for an e-UTRA protocol stack, the protocol stack 310 includes the LTE PHY layer 202, the RLC layer 206, the PDCP layer 208, and the RRC layer 210. Although not illustrated as such, PDCP entities correspond to the multiple radio bearers over which traffic is carried. In contrast to a typical e-UTRA protocol stack, the protocol stack 310 includes the upper LTE MAC layer 262 and the lower LTE MAC layer 264. The protocol stack 310 includes the IEEE 802.11 PHY layer 212 and the IEEE 802.11 MAC layer 242 to facilitate WLAN communications. The protocol stack 310 further includes a modified IEEE 802.2 LLC layer 312 between the IEEE 802.11 MAC layer 242 and the upper LTE MAC layer 262. Functionality of the modified IEEE 802.2 LLC layer 312 is described below.

Figure 7B:
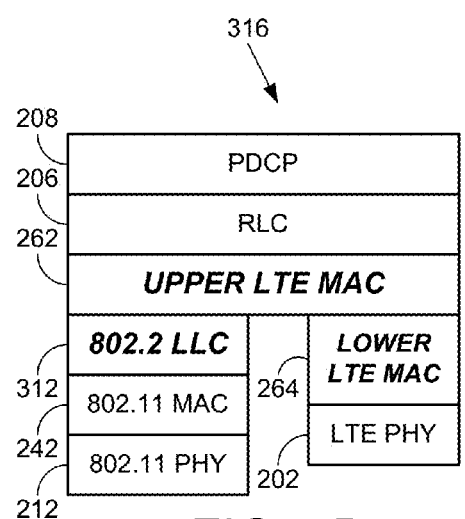

FIG. 7B illustrates an example protocol stack 316 suitable for implementation by the SeNB 134 illustrated in FIG. 1G. The protocol stack 316 differs from the protocol stack 310 illustrated in FIG. 7A in that the RRC layer 210 is absent from the protocol stack 316.

Figure 7C:
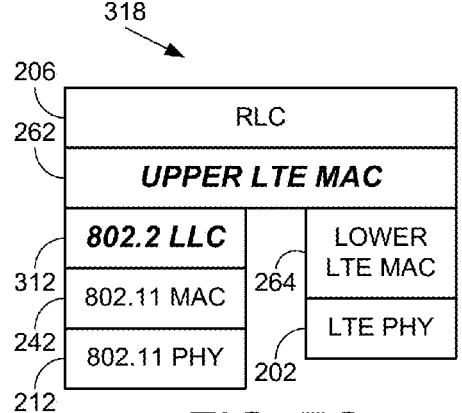

FIG. 7C illustrates an example protocol stack 318 suitable for implementation by the SeNB 84 illustrated in FIG. 1D. The protocol stack 318 differs from the protocol stack 310 illustrated in FIG. 7A in that the PDCP layer 208 and the RRC layer 210 are absent from the protocol stack 318. Rather, the multiple RLC entities in the protocol stack 318 (corresponding to multiple logical channels) interface to corresponding multiple PDCP entities in the MeNB.

Figure 7D:
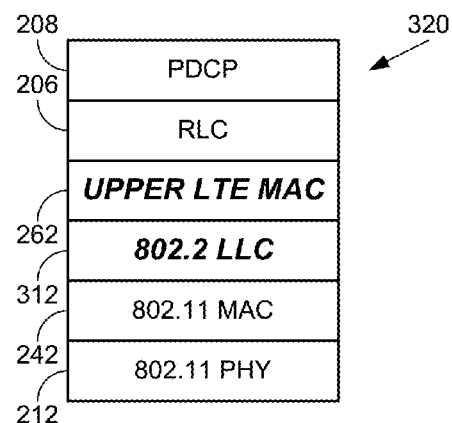

FIG. 7D illustrates an example protocol stack 320 suitable for implementation by the SeNB 112 illustrated in FIG. 1F. The protocol stack 320 includes the IEEE 802.11 PHY layer 212 and the IEEE 802.11 MAC layer 242 to facilitate WLAN communications. The protocol stack 320 includes the modified IEEE 802.2 LLC layer 312 above the IEEE 802.11 MAC layer 242 and the upper LTE MAC layer 262 above the modified IEEE 802.2 LLC layer 312. The protocol stack 320 further includes the RLC layer 206 above the upper LTE MAC layer 262 and the PDCP layer 208 above the RLC layer 206. Although not illustrated as such, multiple PDCP entities correspond to multiple radio bearers over which traffic is carried.

Figure 7E:
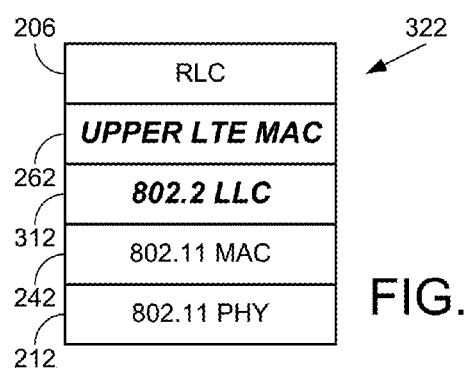

FIG. 7E illustrates an example protocol stack 322 suitable for implementation by the SeNB 64 illustrated in FIG. 1C. The protocol stack 322 differs from the protocol stack 320 illustrated in FIG. 7D in that the PDCP layer 208 is absent from the protocol stack 322. Rather, the multiple RLC entities in the protocol stack 322 (corresponding to multiple logical channels) interface to corresponding multiple PDCP entities in the MeNB.

Figure 7F:
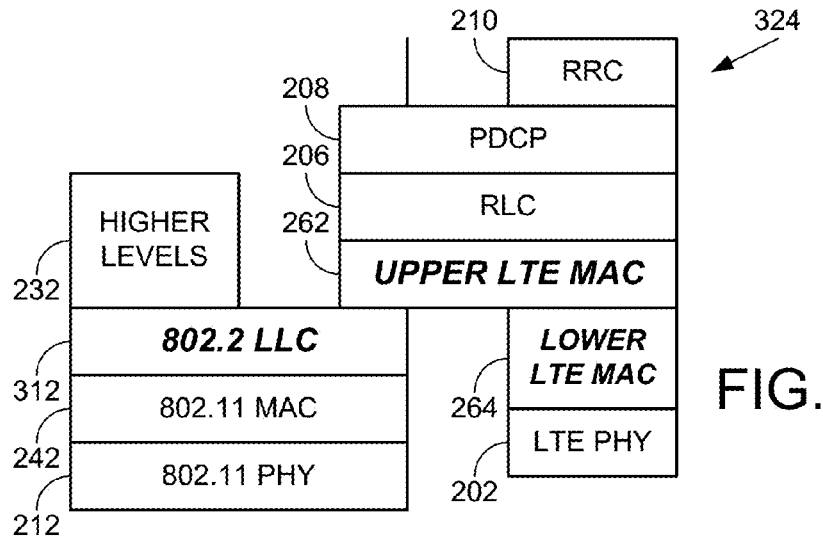

FIG. 7F illustrates an example protocol stack 324 suitable for implementation by the eNB-AP 36 illustrated in FIG. 1B. The protocol stack 324 differs from the protocol stack 310 illustrated in FIG. 7A in that the protocol stack 324, for handling of conventional WLAN traffic, includes the higher levels 232 above the modified IEEE 802.2 LLC layer 312.

Figure 7G:
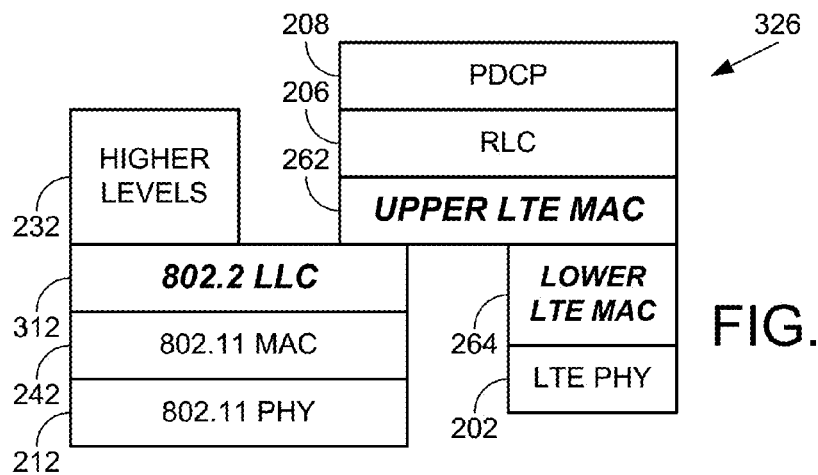

FIG. 7G illustrates an example protocol stack 326 suitable for implementation by the SeNB-AP 142 illustrated in FIG. 1H. The protocol stack 326 differs from the protocol stack 324 illustrated in FIG. 7F in that the RRC layer 210 is absent from the protocol stack 326.

Figure 7H:
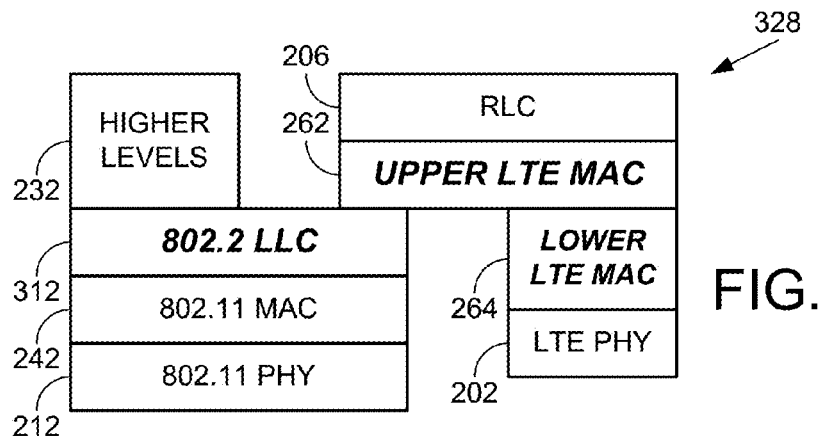

FIG. 7H illustrates an example protocol stack 328 suitable for implementation by the SeNB-AP 92 illustrated in FIG. 1E. The protocol stack 328 differs from the protocol stack 324 illustrated in FIG. 7F in that the PDCP layer 208 and the RRC layer 210 are absent from the protocol stack 328. Rather, the multiple RLC entities in the protocol stack 328 (corresponding to multiple logical channels) interface to corresponding multiple PDCP entities in the MeNB.

A first variant of the fourth aspect makes use of local assignment of LLC SAP fields of an IEEE 802.2 LLC header. As mentioned above, conventionally, users can agree to use locally assigned LLC SAPs for either an entity of communication or a type of communication. In the first variant, the LLC SAP fields of an IEEE 802.2 LLC header are repurposed to indicate that traffic is routed from or routed to an RLC layer. In the transmitter apparatus, a component implementing the upper LTE MAC layer 262 builds a PDU which includes at least one LCID, as described above with respect to the third aspect (except that in the third aspect, the PDU forms the payload of the IEEE 802.11 MAC frame, and in this variant, the PDU forms the payload of the IEEE 802.2 frame). In the transmitter apparatus, a component implementing the modified IEEE 802.2 LLC layer 312 generates the IEEE 802.2 LLC header that includes in the DSAP field an LLC SAP value indicative of 3GPP traffic and that includes in the LSAP field an LLC SAP value indicative of 3GPP traffic. The LLC SAP value indicative of 3GPP traffic may be written into the 3GPP specifications, or alternatively, the LLC SAP value indicative of 3GPP traffic could be configured by the RRC layer 210.

An example format of an LLC PDU is shown in TABLE 9 below.

TABLE 9

IEEE 802.2 LLC PDU with 3GPP value in LSAP and LCID in payload

| DSAP 3GPP value 1 octet | SSAP 3GPP value 1 octet | CTL 03 1 octet | R/R/E/LCID sub-header 1 octet | LTE MAC SDUN octets |
|---|---|---|---|---|
| LLC PDU header | | | LTE MAC header | LTE MAC payload |
| | | | LLC SDU | |
| | | IEEE 802.11 MAC payload | | |

The receiver apparatus may be an access point that handles conventional WLAN traffic (for example, the eNB-AP 36, the SeNB-AP 92, and the SeNB-AP 142). In that case, the component implementing the modified IEEE 802.2 LLC layer 312 inspects the values in the DSAP and SSAP fields of the IEEE 802.2 LLC header. If those values are not indicative of 3GPP traffic, the component forwards the LLC SDU to the appropriate higher layer within the higher levels 232. If those values are indicative of 3GPP traffic, the component forwards the LLC SDU to the component implementing the upper LTE MAC layer 262. The component implementing the upper LTE MAC layer 262 inspects the LCID value in the LTE MAC sub-header and uses that LCID value to determine to which RLC entity to forward the LTE MAC SDU for processing.

Alternatively, all WLAN traffic received by the receiver apparatus may be routed to the RLC layer. In that case, the component implementing the modified IEEE 802.2 LLC layer 312 inspects the values in the DSAP and SSAP fields of the IEEE 802.2 LLC header. If those values are indicative of 3GPP traffic, the component forwards the LLC SDU to the component implementing the upper LTE MAC layer 262. The component implementing the upper LTE MAC layer 262 inspects the LCID value in the LTE MAC sub-header and uses that value to determine to which RLC entity to forward the LTE MAC SDU for processing.

A second variant of the fourth aspect makes use of SNAP. As mentioned above, conventionally, the Protocol Type field of the SNAP PDU is used to distinguish between different higher-layer protocols from the organization identified in the OUI field of the SNAP PDU. In the second variant, the OUI field is repurposed to indicate that traffic is routed from or routed to an RLC layer. In the transmitter apparatus, a component implementing the upper LTE MAC layer 262 builds a PDU includes at least one LCID, as described above with respect to the third aspect (except that in the third aspect, the PDU forms the payload of the IEEE 802.11 MAC frame, and in this variant, the PDU forms the payload of the IEEE 802.2 frame).

In the transmitter apparatus, a component implementing the modified IEEE 802.2 LLC layer 312 generates the IEEE 802.2 LLC header that includes in the DSAP field and the SSAP field values indicating the presence of the SNAP PDU, and generates the SNAP PDU that includes a new OUI value assigned by the IEEE Registration Authority for 3GPP use.

The receiver apparatus may be an access point that handles conventional WLAN traffic (for example, the eNB-AP 36, the SeNB-AP 92, and the SeNB-AP 142). In that case, the component implementing the modified IEEE 802.2 LLC layer 312 inspects the values in the DSAP and SSAP fields of the IEEE 802.2 LLC header. Because those fields indicate the presence of the SNAP PDU, the component implementing the modified IEEE 802.2 layer 312 inspects the value in the OUI field. If the OUI field does not have the new OUI value assigned for 3GPP use, the component forwards the Protocol Data of the SNAP PDU to the higher levels 232 for processing as conventional uplink WLAN traffic. If the OUI field has the new OUI value assigned for 3GPP use, the component forwards the Protocol Data of the SNAP PDU to the component implementing the upper LTE MAC layer 262. The component implementing the upper LTE MAC layer 262 inspects the LCID value in the LTE MAC sub-header and uses that value to determine to which RLC entity to forward the LTE MAC SDU for processing.

Alternatively, all WLAN traffic received by the receiver apparatus may be routed to the RLC layer. In that case, the component implementing the modified IEEE 802.2 LLC layer 312 inspects the values in the DSAP and SSAP fields of the IEEE 802.2 LLC header. Because those fields indicate the presence of the SNAP PDU, the component implementing the modified IEEE 802.2 LLC layer 312 inspects the value in the OUI field. If the OUI field has the new OUI value assigned for 3GPP use, the component forwards the Protocol Data of the SNAP PDU to the component implementing the upper LTE MAC layer 262. The component implementing the upper LTE MAC layer 262 inspects the LCID value in the LTE MAC sub-header and uses that value to determine to which RLC entity to forward the LTE MAC SDU for processing.

An example format of an LLC PDU is shown in TABLE 10 below.

TABLE 10

IEEE 802.2 LLC PDU with 3GPP specific OUI and LCID in payload

| DSAP 0xAA 1 octet | SSAP 0xAA 1 octet | CTL 03 1 octet | OUI 3GPP-specific value 3 octets | Protocol Type 2 octets | R/R/E/LCID sub-header 1 octet | LTE MAC SDU N octets |
|---|---|---|---|---|---|---|
| LLC PDU header | | | | | LTE MAC header | LTE MAC payload |
| | | | | | SNAP PDU | |
| | | | IEEE 802.11 MAC payload | | | |

A third variant of the fourth aspect makes use of SNAP. As mentioned above, conventionally, the Protocol Type field of the SNAP PDU is used to distinguish between different higher-layer protocols from the organization identified in the OUI field of the SNAP PDU. In the third variant, the Protocol Type field is repurposed to indicate that traffic is routed from or routed to an RLC layer. In the transmitter apparatus, a component implementing the upper LTE MAC layer 262 builds a PDU includes at least one LCID, as described above with respect to the third aspect (except that in the third aspect, the PDU forms the payload of the IEEE 802.11 MAC frame, and in this variant, the PDU forms the payload of the IEEE 802.2 frame).

In the transmitter apparatus, a component implementing the modified IEEE 802.2 LLC layer 312 generates the IEEE 802.2 LLC header that includes in the DSAP field and the SSAP field values indicating the presence of the SNAP PDU, and generates the SNAP PDU that includes the OUI value '00 00 00' for Ethernet and a new Protocol Type value assigned by the IEEE Registration Authority for 3GPP use.

The receiver apparatus may be an access point that handles conventional WLAN traffic (for example, the eNB-AP 36, the SeNB-AP 92, and the SeNB-AP 142). In that case, the component implementing the modified IEEE 802.2 LLC layer 312 inspects the values in the DSAP and SSAP fields of the IEEE 802.2 LLC header. Because those fields indicate the presence of the SNAP PDU, the component implementing the modified IEEE 802.2 layer 312 inspects the value in the OUI field and the value in the Protocol Type field. If the OUI field has the '00 00 00' value for Ethernet and the Protocol Type field has the new value assigned for 3GPP use, the component forwards the Protocol Data of the SNAP PDU to the component implementing the upper LTE MAC layer 262. The component implementing the upper LTE MAC layer 262 inspects the LCID value in the LTE MAC sub-header and uses that value to determine to which RLC entity to forward the LTE MAC SDU for processing.

If the Protocol Type field does not have the new value assigned for 3GPP use, the component implementing the modified IEEE 802.2 LLC layer 312 forwards the Protocol Data of the SNAP PDU to the higher levels 232, as indicated in the Protocol Type field, for processing as is the case for conventional uplink WLAN traffic.

Alternatively, all WLAN traffic received by the receiver apparatus may be routed to the RLC layer. In that case, the component implementing the modified IEEE 802.2 LLC layer 312 inspects the values in the DSAP and SSAP fields of the IEEE 802.2 LLC header. Because those fields indicate the presence of the SNAP PDU, the component implementing the modified IEEE 802.2 layer 312 inspects the value in the OUI field and the value in the Protocol Type field. If the OUI field has the '00 00 00' value for Ethernet and the Protocol Type field has the new value assigned for 3GPP use, the component forwards the Protocol Data of the SNAP PDU to the component implementing the upper LTE MAC layer 262. The component implementing the upper LTE MAC layer 262 inspects the LCID value in the LTE MAC sub-header and uses that value to determine to which RLC entity to forward the LTE MAC SDU for processing.

An example format of an LLC PDU is shown in TABLE 11 below.

TABLE 11

IEEE 802.2 LLC PDU with 3GPP specific Protocol Type value and LCID in payload

| DSAP 0xAA 1 octet | SSAP 0xAA 1 octet | CTL 03 1 octet | OUI 00 00 00 3 octets | Protocol Type 3GPP-specific value 2 octets | R/R/E/LCID sub-header 1 octet | LTE MAC SDU N octets |
|---|---|---|---|---|---|---|
| LLC PDU header | | | | | LTE MAC header | LTE MAC payload |
| | | | | | SNAP PDU | |
| | | | IEEE 802.11 MAC payload | | | |

Virtual APs

An AP, for example any of eNB-AP 36, SeNB-AP 92, and SeNB-AP 142, may support multiple separate WLANs. For example, the AP may operate as two or more virtual access points. The AP may be configured with different network names (also known as service set identifiers (SSIDs)), one network name for each virtual access point. Each network name is associated with its own basic service set identifier (BSSID). The BSSID is included in the IEEE 802.11 MAC frame header when the frame is built in a transmitter apparatus. In a receiver apparatus, it is the BSSID that tells the AP that this is a frame which the AP should decode. Essentially, the BSSID is an IEEE 802.11 MAC address.

For example, a first network name and a first BSSID may be used for stations (such as the WLAN station 42) requiring conventional WLAN access, and a second network name and a second BSSID may be used for stations (such as UE 24) whose traffic is routed to or from an RLC layer. The AP may implement the protocol stack illustrated in any one of FIGS. 4F-4H. In the AP as a receiver apparatus, the component implementing the IEEE 802.11 MAC layer 242 inspects the BSSID in the received IEEE 802.11 MAC frame to determine whether the payload of the received frame should be passed to the component implementing the upper LTE MAC layer 262 or should be passed to a component implementing the IEEE 802.2 LLC layer 230 for processing as conventional uplink WLAN traffic. Thus the use of a network name and a BSSID dedicated solely for WLAN traffic routed to or from an RLC layer enables the AP to distinguish between conventional uplink WLAN traffic and uplink WLAN traffic that is to be routed to an RLC layer.

The AP may broadcast both the first network name used for conventional WLAN access and the second network name used for traffic that is routed to or from an RLC layer. However, broadcasting the second network name may confuse users who desire only conventional WLAN access and at the very least will increase the number of network names displayed to stations when scanning for WLANs.

Alternatively, the AP may refrain from broadcasting the second network name being used for stations (such as the UE 24) whose traffic is routed to or from an RLC layer. With that alternative, the AP may make the second BSSID available through RRC signaling to stations wishing to use the AP to access a core network. For example, the second BSSID may be included in a RadioResourceConfigCommon information element or in a RadioResourceConfigCommonSIB information element.

Figure 8:
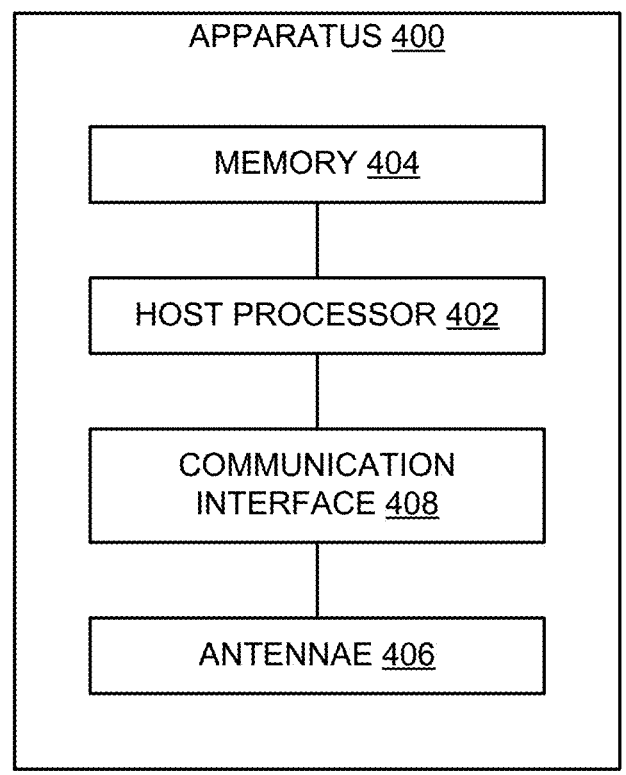
FIG. 8 illustrates a simplified block diagram of an example apparatus.

FIG. 8 illustrates a simplified block diagram of an example apparatus 400. The eNB 20, the UE 24, the eNB-AP 36, the SeNB 64, the MeNB 80, the SeNB 84, the SeNB-AP 92, the SeNB 112, the SeNB 134, and the SeNB-AP 142 are all examples of the apparatus 400.

The apparatus 400 comprises a host processor 402 and a memory 404 coupled to the host processor 402. The apparatus 400 further comprises one or more antennae 406.

The apparatus 400 further comprises a communication interface 408 coupled to the one or more antennae 406 and to the host processor 402. The communication interface 408 is implemented in one or more integrated circuits. In the event that the communication interface 408 is implemented in two or more integrated circuits, the integrated circuits are coupled therebetween to allow for traffic flow and signaling. The communication interface 408 implements a protocol stack, for example, any one of the protocol stacks illustrated in FIGS. 2A-2H, FIGS. 3A-3H, FIGS. 4A-4H, and FIGS. 7A-7H. The communication interface 408 may be considered to include components that implement the various layers of the protocol stack. The communication interface 408 is operative to carry out the techniques described in this document. The apparatus 400 may comprise additional elements that, for the sake of clarity, are not shown in FIG. 8 and are not described in this document.

Various obvious modifications of the techniques and mechanisms described in this document will be apparent to persons of ordinary skill in the art and are within the scope of the claims. For example, the LTE PHY layer 202 and the LTE MAC layer 204 may be replaced by a UMTS PHY layer and a UMTS MAC layer, respectively, in the example protocol stacks illustrated in FIGS. 2A-2H and FIGS. 3A-3H. In another example, the LTE PHY 202 and the LTE MAC layer 204 may be replaced by a PHY layer and a MAC layer, respectively, of future 3GPP specifications in the example protocol stacks illustrated in FIGS. 2A-2H and FIGS. 3A-3H. Alternatively, the upper LTE MAC layer 262 and the lower LTE MAC layer 264 may be replaced by UMTS equivalents or future 3GPP equivalents in the example protocol stacks illustrated in FIGS. 4A-4H and FIGS. 7A-7H.

In a further example, the higher levels 244 may not be required for handling of conventional WLAN traffic. Some protocols, such as Extensible Authentication Protocol (EAP) and Address Resolution Protocol (ARP) may be terminated in an AP. In these cases, uplink IEEE 802.11 MAC frames would have the destination address field in the header set to the IEEE 802.11 MAC address of the AP itself. Other protocols, such as Internet Protocol (IP), may have their frames unpacked at the router rather than at the AP. In that case, uplink IEEE 802.11 MAC frames would have the destination address field in the header set to the IEEE 802.11 MAC address of the router, and the LLC frame and the IP frame would only be unpacked at the router. The destination address received in the IEEE 802.11 MAC header would be used by the AP to build an Ethernet frame which ensures that the uplink frame is conveyed (over Ethernet) from the AP to the router using Layer 2 mechanisms.

In a further example, the source and destination addresses in the IEEE 802.11 MAC header may be used to provide the binary distinction between conventional WLAN traffic and IEEE 802.11 traffic that is associated with a 3GPP RLC layer, whilst the upper LTE MAC protocol layer is used to convey logical channel identities.

In yet another example, the communication networks illustrated in FIGS. 1E and 1n FIG. 1H each include a MeNB and a SeNB-AP. An obvious modification would be for the MeNB to be replaced by an MeNB-AP that supports a WLAN and for the SeNB-AP to be replaced by an SeNB. Another obvious modification would be for the MeNB to be replaced by an MeNB-AP that supports a WLAN, while the SeNB-AP is unchanged. Examples of the protocol stack implemented by an MeNB-AP may be modified from the above-described examples of protocol stack implemented by an SeNB-AP to include a PDCP layer (if not already present) and an RRC layer.

One or more aspects of the functionality described above may be implemented within an IEEE 802.11Ak™ layer and/or IEEE 802.1 Ac™ layer. One or either or both of these may thus provide some or all of the services and functionality and techniques described in this document.

The scope of the claims should not be limited by the details set forth in the examples, but should be given the broadest interpretation consistent with the description as a whole.

What is claimed is:

1. A routing method performed by a receiver apparatus, the routing method comprising:
   identifying a logical channel from information contained in an IEEE 802.11 media access control (MAC) protocol data unit (PDU), a payload of the IEEE 802.11 MAC PDU containing a 3GPP radio link control (RLC) PDU; and
   routing the RLC PDU within the receiver apparatus to an RLC entity that is associated with the identified logical channel,
   wherein identifying the logical channel comprises:
      at a component of the receiver apparatus that implements an IEEE 802.11 MAC layer, identifying the logical channel from a value stored in a source address field or a destination address field or a receiver address field or a transmitter address field of a header of the IEEE 802.11 MAC PDU.

2. A routing method performed by a receiver apparatus, the routing method comprising:
   identifying a logical channel from information contained in an IEEE 802.11 media access control (MAC) protocol data unit (PDU), a payload of the IEEE 802.11 MAC PDU containing a 3GPP radio link control (RLC) PDU; and
   routing the RLC PDU within the receiver apparatus to an RLC entity that is associated with the identified logical channel,
   wherein the payload of the IEEE 802.11 MAC PDU contains an IEEE 802.2 logical link control (LLC) PDU and a payload of the IEEE 802.2 LLC PDU contains the 3GPP RLC PDU, and identifying the logical channel comprises:
      at a component of the receiver apparatus that implements an IEEE 802.2 LLC layer:
         determining that the IEEE 802.2 LLC PDU contains an LLC sub-network access protocol (SNAP) PDU; and
         identifying the logical channel from a value in a Protocol Type field of the LLC SNAP PDU.

3. A routing method performed by a receiver apparatus, the routing method comprising:
   identifying a logical channel from information contained in an IEEE 802.11 media access control (MAC) protocol data unit (PDU), a payload of the IEEE 802.11 MAC PDU containing a 3GPP radio link control (RLC) PDU; and
   routing the RLC PDU within the receiver apparatus to an RLC entity that is associated with the identified logical channel,
   wherein the payload of the IEEE 802.11 MAC PDU contains an IEEE 802.2 logical link control (LLC) PDU and a payload of the IEEE 802.2 LLC PDU contains the 3GPP RLC PDU, and identifying the logical channel comprises:
      at a component of the receiver apparatus that implements an IEEE 802.2 LLC layer, identifying the logical channel from LLC service access point (SAP) values in a LLC header contained in the IEEE 802.2 LLC PDU.

4. A routing method performed by a receiver apparatus, the routing method comprising:
   identifying a logical channel from information contained in an IEEE 802.11 media access control (MAC) protocol data unit (PDU), a payload of the IEEE 802.11 MAC PDU containing a 3GPP radio link control (RLC) PDU; and
   routing the RLC PDU within the receiver apparatus to an RLC entity that is associated with the identified logical channel,
   wherein the payload of the IEEE 802.11 MAC PDU contains a Long Term Evolution (LTE) MAC header and identifying the logical channel comprises:
      at a component of the receiver apparatus that implements an upper Long Term Evolution (LTE) MAC layer, identifying the logical channel from logical channel identifier (LCD) values in the LTE MAC header.

5. A method performed by a transmitter apparatus for handling 3GPP radio link control (RLC) protocol data units (PDUs), the method comprising:
   selecting a frame to be transported over a wireless local area network (WLAN) air interface, the frame containing a 3GPP RLC PDU from a particular logical channel; and
   generating an IEEE 802.11 MAC frame that contains the 3GPP RLC PDU in a payload of the IEEE 802.11 MAC frame and that contains identifying information from which the particular logical channel can be identified,
   wherein generating the IEEE 802.11 MAC frame comprises:
      at a component of the transmitter apparatus that implements an IEEE 802.11 MAC layer, generating a header for the IEEE 802.11 MAC frame that contains the identifying information in a source address field or a destination address field or a receiver address field or a transmitter address field of the header.

6. A method performed by a transmitter apparatus for handling 3GPP radio link control (RLC) protocol data units (PDUs), the method comprising:
   selecting a frame to be transported over a wireless local area network (WLAN) air interface, the frame containing a 3GPP RLC PDU from a particular logical channel;
   generating an IEEE 802.11 MAC frame that contains the 3GPP RLC PDU in a payload of the IEEE 802.11 MAC frame and that contains identifying information from which the particular logical channel can be identified, and
   at a component of the transmitter apparatus that implements an IEEE 802.2 Logical Link Control (LLC) layer:
      generating an LLC Sub-Network Access Protocol (SNAP) PDU that includes i) an organizationally-unique identifier (OUI) value assigned for $3^{rd}$ generation partnership protocol (3GPP) use, ii) an identification of the logical channel in a Protocol Type field; and iii) the 3GPP RLC PDU in a Protocol Data field; and
      generating an LLC header that indicates presence of the LLC SNAP PDU,
   wherein generating the IEEE 802.11 MAC frame comprises including the LLC header and the LLC SNAP PDU in the payload of the IEEE 802.11 MAC frame.

7. A method performed by a transmitter apparatus for handling 3GPP radio link control (RLC) protocol data units (PDUs), the method comprising:
   selecting a frame to be transported over a wireless local area network (WLAN) air interface, the frame containing a 3GPP RLC PDU from a particular logical channel;
   generating an IEEE 802.11 MAC frame that contains the 3GPP RLC PDU in a payload of the IEEE 802.11 MAC frame and that contains identifying information from which the particular logical channel can be identified, and at a component of the transmitter apparatus that implements an IEEE 802.2 Logical Link Control (LLC) layer:

generating an LLC header having LLC service access point (SAP) values from which the particular logical channel can be identified, wherein generating the IEEE 802.11 MAC frame comprises including the LLC header in the payload of the IEEE 802.11 MAC frame.

8. A method performed by a transmitter apparatus for handling 3GPP radio link control (RLC) protocol data units (PDUs), the method comprising:

selecting a frame to be transported over a wireless local area network (WLAN) air interface, the frame containing a 3GPP RLC PDU from a particular logical channel;

generating an IEEE 802.11 MAC frame that contains the 3GPP RLC PDU in a payload of the IEEE 802.11 MAC frame and that contains identifying information from which the particular logical channel can be identified, and at a component of the transmitter apparatus that implements an upper Long Term Evolution (LTE) MAC layer:

generating an LTE MAC header having logical channel identifier (LCID) values from which the particular logical channel can be identified, wherein generating the IEEE 802.11 MAC frame comprises including the LTE MAC header in the payload of the IEEE 802.11 MAC frame.

\* \* \* \* \*